United States Patent
Erol et al.

(10) Patent No.: US 7,554,576 B2
(45) Date of Patent: Jun. 30, 2009

(54) INFORMATION CAPTURE AND RECORDING SYSTEM FOR CONTROLLING CAPTURE DEVICES

(75) Inventors: Berna Erol, Cupertino, CA (US); Jonathan J. Hull, San Carlos, CA (US); Dar-Shyang Lee, Union City, CA (US)

(73) Assignee: Ricoh Company, Ltd., Tokyo (JP)

( * ) Notice: Subject to any disclaimer, the term of this patent is extended or adjusted under 35 U.S.C. 154(b) by 793 days.

(21) Appl. No.: 11/158,313

(22) Filed: Jun. 20, 2005

(65) Prior Publication Data

US 2006/0284981 A1 Dec. 21, 2006

(51) Int. Cl.
*H04N 7/18* (2006.01)
*H04N 5/232* (2006.01)
*G06F 3/00* (2006.01)

(52) U.S. Cl. ............... 348/211.3; 348/159; 348/211.11; 715/732

(58) Field of Classification Search ................. 348/169, 348/211.12, 159, 14.11, 14.1, 14.08, 211.99, 348/211.3, 211.11; 715/770, 730, 719, 732; 709/204

See application file for complete search history.

(56) References Cited

U.S. PATENT DOCUMENTS

| | | | |
|---|---|---|---|
| 4,578,718 A | 3/1986 | Parker et al. | |
| 4,686,698 A | 8/1987 | Tompkins et al. | |
| 4,787,063 A | 11/1988 | Muguet | |
| 4,807,186 A | 2/1989 | Ohnishi et al. | |
| 4,881,135 A | 11/1989 | Heilweil | |
| 4,905,094 A | 2/1990 | Pocock et al. | |
| 4,963,995 A | 10/1990 | Lang | |
| 5,091,931 A | 2/1992 | Milewski | |
| 5,164,839 A | 11/1992 | Lang | |
| 5,206,929 A | 4/1993 | Langford et al. | |
| 5,265,205 A | 11/1993 | Schroder | |
| 5,321,396 A | 6/1994 | Lamming et al. | |
| 5,363,425 A | 11/1994 | Mufti et al. | |
| 5,436,792 A | 7/1995 | Leman et al. | |
| 5,475,741 A | 12/1995 | Davis et al. | |
| 5,485,611 A | 1/1996 | Astle | |
| 5,491,511 A | 2/1996 | Odle | |
| 5,502,774 A | 3/1996 | Bellegarda et al. | |
| 5,526,037 A * | 6/1996 | Cortjens et al. | 348/14.1 |
| 5,530,235 A | 6/1996 | Stefik et al. | |

(Continued)

FOREIGN PATENT DOCUMENTS

JP 403129990 6/1991

(Continued)

OTHER PUBLICATIONS

U.S. Appl. No. 09/521,252, filed Mar. 8, 2000, Lee et al.

(Continued)

*Primary Examiner*—Jason Whipkey
(74) *Attorney, Agent, or Firm*—Townsend & Townsend & Crew, LLP

(57) ABSTRACT

Techniques for capturing and receiving digital information. The digital information may comprise information of one or more types including video information, audio information, images, documents, whiteboard information, notes information, and the like. Various actions may be performed based upon the digital information. The digital information may be captured by one or more capture devices.

38 Claims, 14 Drawing Sheets

U.S. PATENT DOCUMENTS

| | | |
|---|---|---|
| 5,535,063 A | 7/1996 | Lamming |
| 5,537,141 A | 7/1996 | Harper et al. |
| 5,539,665 A | 7/1996 | Lamming et al. |
| 5,568,406 A | 10/1996 | Gerber |
| 5,596,581 A | 1/1997 | Saeijs et al. |
| 5,610,841 A | 3/1997 | Tanaka et al. |
| 5,633,723 A | 5/1997 | Sugiyama et al. |
| 5,635,982 A | 6/1997 | Zhang et al. |
| 5,673,016 A | 9/1997 | Lutes |
| 5,686,957 A | 11/1997 | Baker |
| 5,706,290 A | 1/1998 | Shaw et al. |
| 5,717,869 A | 2/1998 | Moran et al. |
| 5,717,879 A | 2/1998 | Moran et al. |
| 5,721,878 A | 2/1998 | Ottesen et al. |
| 5,729,741 A | 3/1998 | Liaguno et al. |
| 5,729,931 A | 3/1998 | Wade |
| 5,734,719 A | 3/1998 | Tsevdos et al. |
| 5,751,281 A | 5/1998 | Hoddie et al. |
| 5,760,767 A | 6/1998 | Shore et al. |
| 5,764,789 A | 6/1998 | Pare, Jr. et al. |
| 5,767,897 A | 6/1998 | Howell |
| 5,793,365 A | 8/1998 | Tang et al. |
| 5,799,150 A | 8/1998 | Hamilton et al. |
| 5,802,294 A | 9/1998 | Ludwig et al. |
| 5,845,261 A | 12/1998 | McAlbian et al. |
| 5,854,831 A | 12/1998 | Parsadayan et al. |
| 5,862,292 A | 1/1999 | Kubota et al. |
| 5,924,099 A | 7/1999 | Guzak et al. |
| 5,929,848 A | 7/1999 | Albukerk et al. |
| 5,946,654 A | 8/1999 | Newman et al. |
| 5,956,026 A | 9/1999 | Ratakonda |
| 5,978,477 A | 11/1999 | Hull et al. |
| 5,986,655 A | 11/1999 | Chiu et al. |
| 5,987,454 A | 11/1999 | Hobbs |
| 5,990,934 A | 11/1999 | Nalwa |
| 5,991,429 A | 11/1999 | Coffin et al. |
| 5,999,173 A | 12/1999 | Ubillos |
| 6,008,807 A | 12/1999 | Bretschneider et al. |
| 6,020,883 A | 2/2000 | Herz et al. |
| 6,041,360 A | 3/2000 | Himmel et al. |
| 6,055,566 A | 4/2000 | Kikinis |
| 6,084,582 A | 7/2000 | Qureshi et al. |
| 6,115,718 A | 9/2000 | Huberman et al. |
| 6,154,601 A | 11/2000 | Yaegashi et al. |
| 6,154,771 A | 11/2000 | Rangan et al. |
| 6,177,939 B1 * | 1/2001 | Blish et al. ............. 715/770 |
| 6,189,783 B1 | 2/2001 | Motomiya et al. |
| 6,193,658 B1 | 2/2001 | Wendelken et al. |
| 6,209,000 B1 | 3/2001 | Klein et al. |
| 6,249,281 B1 | 6/2001 | Chen et al. |
| 6,332,147 B1 | 12/2001 | Moran et al. |
| 6,334,109 B1 | 12/2001 | Kanevsky |
| 6,349,297 B1 | 2/2002 | Shaw et al. |
| 6,369,835 B1 | 4/2002 | Lin |
| 6,392,694 B1 * | 5/2002 | Bianchi ............. 348/169 |
| 6,393,462 B1 | 5/2002 | Mullen-Schultz |
| 6,396,500 B1 | 5/2002 | Qureshi et al. |
| 6,405,203 B1 | 6/2002 | Collart |
| 6,421,009 B2 | 7/2002 | Suprunov |
| 6,449,653 B2 | 9/2002 | Klemets et al. |
| 6,452,615 B1 | 9/2002 | Chiu et al. |
| 6,469,711 B2 | 10/2002 | Foreman et al. |
| 6,490,601 B1 | 12/2002 | markus et al. |
| 6,510,553 B1 | 1/2003 | Hazra |
| 6,526,426 B1 * | 2/2003 | Lakritz ............. 715/264 |
| 6,529,920 B1 | 3/2003 | Arons et al. |
| 6,535,639 B1 | 3/2003 | Uchihachi et al. |
| 6,571,295 B1 | 5/2003 | Sidana |
| 6,646,655 B1 | 11/2003 | Brandt et al. |
| 6,665,490 B2 | 12/2003 | Copperman et al. |
| 6,721,488 B1 | 4/2004 | Dimitrova et al. |
| 6,728,753 B1 | 4/2004 | Parasnis et al. |
| 6,750,978 B1 | 6/2004 | Marggraff et al. |
| 6,766,363 B1 | 7/2004 | Rothschild |
| 6,779,024 B2 | 8/2004 | DeLaHuerga |
| 6,782,049 B1 | 8/2004 | Dufaux et al. |
| 6,789,228 B1 | 9/2004 | Merrill et al. |
| 6,816,858 B1 | 11/2004 | Coden et al. |
| 6,976,032 B1 | 12/2005 | Hull et al. |
| 7,020,721 B1 | 3/2006 | Levenberg |
| 7,131,058 B1 | 10/2006 | Lapstun et al. |
| 7,167,191 B2 | 1/2007 | Hull et al. |
| 7,174,289 B2 * | 2/2007 | Sukehiro ............. 704/7 |
| 7,184,100 B1 | 2/2007 | Wilf et al. |
| 7,215,436 B2 | 5/2007 | Hull et al. |
| 7,299,405 B1 | 11/2007 | Lee et al. |
| 7,343,617 B1 | 3/2008 | Katcher et al. |
| 2001/0037408 A1 | 11/2001 | Thrift et al. |
| 2001/0054019 A1 * | 12/2001 | de Fabrega ............. 705/35 |
| 2002/0010641 A1 | 1/2002 | Stevens et al. |
| 2002/0048224 A1 | 4/2002 | Dygert et al. |
| 2002/0056082 A1 | 5/2002 | Hull et al. |
| 2002/0097885 A1 | 7/2002 | Birchfield et al. |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2003/0007776 A1 | 1/2003 | Kameyama et al. |
| 2003/0117652 A1 | 6/2003 | Lapstun |
| 2003/0220988 A1 | 11/2003 | Hymel |
| 2004/0054964 A1 | 3/2004 | Bozdagi et al. |
| 2004/0078805 A1 * | 4/2004 | Brian et al. ............. 725/1 |
| 2004/0105004 A1 * | 6/2004 | Rui et al. ............. 348/159 |
| 2004/0143602 A1 | 7/2004 | Ruiz et al. |
| 2004/0201685 A1 | 10/2004 | Seaman et al. |
| 2004/0249650 A1 | 12/2004 | Freedman et al. |
| 2005/0064935 A1 | 3/2005 | Blanco |
| 2006/0005136 A1 * | 1/2006 | Wallick et al. ............. 715/726 |
| 2006/0041542 A1 | 2/2006 | Hull et al. |
| 2006/0041632 A1 * | 2/2006 | Shah et al. ............. 709/217 |
| 2006/0288273 A1 | 12/2006 | Erol et al. |
| 2007/0033419 A1 | 2/2007 | Kocher et al. |
| 2007/0038935 A1 | 2/2007 | Hull et al. |

FOREIGN PATENT DOCUMENTS

| | | |
|---|---|---|
| JP | 10-246041 | 9/1998 |
| JP | 2007-004784 A | 1/2007 |
| KR | 2003-0097669 A | 12/2003 |
| KR | 10-2006-0133469 A | 12/2006 |
| WO | WO 02/013522 A2 | 2/2002 |
| WO | WO 02/058432 A2 | 7/2002 |

OTHER PUBLICATIONS

Communication Pursuant to Article 96(2) EPC, European Application No. 04255836.1, Jun. 11, 2007, 10 pages.

Denoue et al., ProjectorBox; Seamless Presentation Capture for Classrooms, *World Conference on E-Learning in Corporate, Government, Healthcare, & Higher Education (E-Learn 2005)*, Oct. 24, 2005.

Hilbert et al., Seamless Capture and Discovery for Corporate Memory, *The 15th International World Wide Web Conference (WWW2006)*, May 23, 2006.

Hilbert et al., Seamless Presentation Capture, Indexing, and Management, *Internet Multimedia Management Systems VI (SPIE Optics East 2005)*, Oct. 26, 2005.

Stifelman, L. et al., "The Audio Notebook," SIGCHI 2001, Mar. 31-Apr. 5, 2001, pp. 182-189, vol. 3, No. 1, Seattle, WA.

Office Action of Apr. 30, 2008 in corresponding Korean application 10-2006-0054748.

Addlesee et al., "The ORL Active Floor," IEEE Personal Communications, vol. 4, No. 5, Oct. 1997, pp. 35-41. ftp://ftp.uk.research.att.com:/pub/docs/att/tr.97.11.pdf.

Adobe Premiere Real-Time editing for HD, SD, and DV, pp. 1-2 downloaded and printed from http://www.adobe.com/products/premiere/index.html on Jan. 18, 2007.

AVerMedia DVD EZmaker USB 2.0, 1 page downloaded and printed from http://www.aver.com/2005home/product/videocapture/ezmakerusb2.0/ezmakerusb2.0.shtml on Jan. 18, 2007.

Chen et al., "Real-time Speaker Tracking Using Particle Filter Sensor Fusion," *Proc. IEEE*, 92(3):485-494 (Mar. 2004).

Cunado et al., "Gait Extraction and Description by Evidencing Gathering," Proceedings of the Second International Conference on Audio and Video-based Person Identification, Washington, D.C., Mar. 22-23, 1999 pp. 43-48.

Cutler et al., "Distributed Meetings: A Meeting Capture and Broadcasting System," ACM Multimedia (2002).

Eldridge et al., "Does A Video Diary Help Recall?", Technical Report EPC-1991-124, People and Computers VII, eds. Monk et al., 1992, pp. 257-269.

Erol et al., "Multimodal Summarization of Meeting Recordings," ICME (2003).

Foote, J. et al. "An Intelligent Media Browser Using Automatic Multimodal Analysis," ACM Multimedia, 1998, pp. 375-380.

Girgensohn, A, and Boreczky, J.S. "Time-Constrained Keyframe Selection Technique," Mutimedia Tools, 11(3): 347-358, (2000).

Gross et al., "Towards a Multimodal Meeting Record," ICME, pp. 1593-1596, New York, (2000).

Hu et al., "Audio Hot Spotting and Retrieval Using Multiple Audio Features and Multiple ASR Engines," HLT-NAACL 2004 Workshop on Interdisciplinary Approaches to Speech Indexing and Retrieval (2004).

ICSI Meeting Recorder Project: Recording software, pp. 1-3 downloaded and printed from http://www.icsi.berkeley.edu/~dpwe/research/mtgrcdr/rcd-sw.html on Jan. 18, 2007.

Jaimes et al., "Memory Cues for Meeting Video Retrieval," *ACM CARPE Workshop 2004*, New York, New York, pp. 74-85 (2004).

Konneker, L., "Automating Receptionists," Proceedings of the 1986 IEEE International Conference on Systems, Man, and Cybernetics, Atlanta, GA, Oct. 14-17, 1986, pp. 1592-1596.

Lamming et al., "Activity-based Information Retrieval: Technology in Support of Personal Memory," in F.H. Vogt (ed.), Personal Computers and Intelligent Systems. Proceedings of Information Processing 92, vol. III, Elsevier Science Publishers, 1992, pp. 68-81.

Lee et al., "Portable Meeting Recorder," ACM Multimedia, pp. 493-502 (2002).

Lovstrand, L., "Being Selectively Aware with the Khronika System," Proceedings of the Second European Conference on Computer-Supported Cooperative Work, Kluwer Academic Publishers, 1991, pp. 265-277.

Meet?ng Room, An Interactive Systems Labs Project, p. 1 downloaded and printed from http://www.is.cs.cmu.edu/meeting_room/browser/browser_toprint.html on Jan. 18, 2007.

Nair, R., "Calculating of an Aggregated Level of Interest Function for Recorded Events," ACM Multimedia (2004).

Newman et al., "PEPSYS: Generating Autobiographies by Automatic Tracking," Proceedings of the Second European Conference on Computer-Supported Cooperative Work, Sep. 25-27, 1991, Amsterdam, The Netherlands, pp. 175-188.

Nuance—ScanSoft Imaging Solutions, p. 1 downloaded and printed from http://www.nuance.com/scansoft/ on Jan. 18, 2007.

Plamondon, R.; and Lorette, G., "Automatic Signature Verification and Writer Identification—The State of the Art," Pattern Recognition, vol. 22, No. 2, 1989, pp. 107-131.

Product Description for Meeting Companion by Quindi Corporation, downloaded from http://quindi.com/product.htm on Jan. 24, 2005.

Rangan, P.V. "Software Implementation of VCRs on Personal Computing Systems," IEEE, 1992, pp. 635-640.

Rangan, P.V. et al., "A Window-Based Editor for Digital Video and Audio," IEEE 1992 pp. 640-648.

Rosenschein, S., "New Techniques for Knowledge Capture," from TTI/Vanguard Conference: Knowledge Management Comes of Age, pp. 1-3, Sep. 23-24, 2003.

Rui et al., "Automating lecture capture and broadcast: technology and videography," *ACM Multimedia Systems Journal*, 10:1-13 (2004).

Seiko Instruments, Inc., "Smart Lobby: The Electronic Sign-In Book That Tracks Visitors and Prints Badges, User Guide for Windows," Manual Part No. 22-93000-00, copyright 1997.

Song et al., "PCCAIS: A Personal Videoconference Archive Indexing System," ICME (2003).

Sony Music Corporation, "E-Guide Unmanned Reception System," Japan Industrial Journal, May 20, 1996, p. 6, (http://salmon.crc.ricoh.com:8001/hull/1999/8/11207/11207.html).

Sony EVI-D100 Pan/Tilt/Zoom Color Video Camera, pp. 1-2 downloaded and printed from http://www.picturephone.com/products/sony_evid100.htm on Jan. 18, 2007.

Systran® Language Translation Technologies, p. 1 downloaded and rpinted from http://www.syttransoft.com/index.html on Jan. 18, 2007.

Uchihashi et al., "Video Magna: Generating Semantically Meaningful Video Summaries," *Proc. Multimedia '99*, pp. 383-392, ACM (1999).

Viredaz, M.A., "The Itsy Pocket Computer Version 1.5: User's Manual," Technical Note TN-54, Compaq Western Research Laboratory, Jul. 1998., pp. 1-37.

Want et al., "The Active Badge Location System," ACM TOIS, Transactions on Information Systems, vol. 10, No. 1, Jan. 1992, pp. 91-102.

WebEx: Web Conferencing, Online Meetings, and Video Conferencing, p. 1 downloaded and printed from http://www.webex.com on Jan. 18, 2007.

\* cited by examiner

INFORMATION CAPTURE AND RECORDING SYSTEM FOR CONTROLLING CAPTURE DEVICES

CROSS-REFERENCES TO RELATED APPLICATIONS

The entire contents of the following applications are herein incorporated by reference for all purposes:

(1) U.S. application Ser. No. 09/728,560 titled TECHNIQUES FOR CAPTURING INFORMATION DURING MULTIMEDIA PRESENTATIONS filed Nov. 30, 2000;

(2) U.S. application Ser. No. 09/728,453 titled TECHNIQUES FOR RECEIVING INFORMATION DURING MULTIMEDIA PRESENTATIONS AND COMMUNICATING THE INFORMATION filed Nov. 30, 2000;

(3) U.S. application Ser. No. 09/521,252 titled METHOD AND SYSTEM FOR INFORMATION MANAGEMENT TO FACILITATE THE EXCHANGE OF IDEAS DURING A COLLABORATIVE EFFORT filed Mar. 8, 2000;

U.S. patent application Ser. No. 11/031,516 titled SEMANTIC CLASSIFICATION AND ENHANCEMENT PROCESSING OF IMAGES FOR PRINTING APPLICATIONS filed Jan. 7, 2005;

U.S. application Ser. No. 10/954,069 titled TECHNIQUES FOR ENCODING MEDIA OBJECTS TO A STATIC VISUAL REPRESENTATION filed Sep. 28, 2004; and U.S. application Ser. No. 10/001,895 titled PAPER-BASED INTERFACE FOR MULTIMEDIA INFORMATION filed Nov. 19, 2001.

BACKGROUND OF THE INVENTION

The present invention relates to information capture systems, and more particularly to techniques for capturing digital information, providing access to the captured information, and performing various actions based upon the digital information.

Several techniques and systems have been devised to capture digital information. For example, information may be captured during meetings, presentations, classroom lectures, demonstrations, conferences, interviews, legal proceedings, focus group meetings, surveillance activities, and the like. The captured digital information may video information and audio information, images, documents, slides, whiteboard information, notes information, and the like. Various information capture devices may be used to capture the information. The captured information is typically stored for subsequent retrieval and use.

Improved techniques are desired for accessing and using the digital information.

BRIEF SUMMARY OF THE INVENTION

Embodiments of the present invention provide a system for capturing and receiving digital information. The digital information may comprise information of one or more types including video information, audio information, images, documents, whiteboard information, notes information, and the like. Various actions may be performed based upon the digital information. The digital information may be captured by one or more capture devices.

According to an embodiment of the present invention, techniques are provided for processing digital information. Digital information is received and a set of one or more events determined from the digital information. An action to be performed is determined based upon the set of events and the action is performed.

The digital information may comprise information captured by a set of one or more capture devices and operation of a capture device from the set of capture devices may be controlled based upon the set of events. The set of events may comprise a slide-related event and the set of capture devices may comprise a camera. A view may be determined based upon the slide-related event and the operation of the camera may be controlled to cause the camera to capture the view. The slide-related event may be an event indicating a slide change, an event indicating consecutive slide changes, an event indicating that a period of time has elapsed without a slide change, or other slide-related event.

In one embodiment, when the slide-related event indicates a slide change then the camera is caused to focus on a presenter. When the slide-related event indicates consecutive slide changes then the camera is made to focus on a screen used for showing one or more slides. When the slide-related event indicates that a time period has elapsed without a slide change then the camera may be made to focus on a room where a presentation is occurring.

According to an embodiment of the present invention, performing the action comprises determining, based upon an event from the set of events, a portion of the digital information to be output, and outputting the portion of the digital information. An entity to which the portion of the digital information is to be output may be determined and the portion of the digital information output to the entity.

According to an embodiment of the present invention, a blog entry may be created based upon an event from the set of events.

According to an embodiment of the present invention, a document may be submitted by a first user. The first user may also submit a first set of one or more preferences to be associated with the document. A request may be received to access the document from a second user. The second user may also provide a second set of one or more preferences. The document may be provided to the second user according to the second set of preferences. In one embodiment, the document is provided to the second user only if permitted by the first set of preferences. The first set of preferences may also identify a format for accessing the document, and the document is provided to the second user in the format identified by the first set of preferences. The first set of preferences may identify a language for accessing the document, and the document is provided to the second user in the language identified by the first set of preferences The second set of preferences may identify a format in which the document is to be accessed, and the document is provided to the second user in the format identified by the second set of preferences. The second set of preferences may identify a language in which the document is to be accessed, and the document is provided to the second user in the language identified by the second set of preferences.

According to an embodiment of the present invention, the digital information or a portion thereof may be streamed via a network.

According to another embodiment of the present invention, a request may be received to copy a portion of the digital information. In response, the portion of the digital information may be converted to a set of one or more representations and the set of representations copied to a clipboard. A request may be received to paste the portion of the digital information. In response, at least one representation from the set of representations may be pasted from the clipboard. In one embodiment, the set of representations may comprise a first representation and a second representation. A first request may be received from a first application to paste the portion of the digital information and a second request may be received from a second application to paste the portion of the digital information. The first representation from the clipboard may be pasted into the first application in response to the first request and the second representation from the clipboard may be pasted into the second application in response to the second request.

According to an embodiment of the present invention, a kiosk is provided that receives a request to export a portion of the digital information. The portion of the digital information is then exported to an external medium.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details. The words data and information are used interchangeably.

Figure 1:
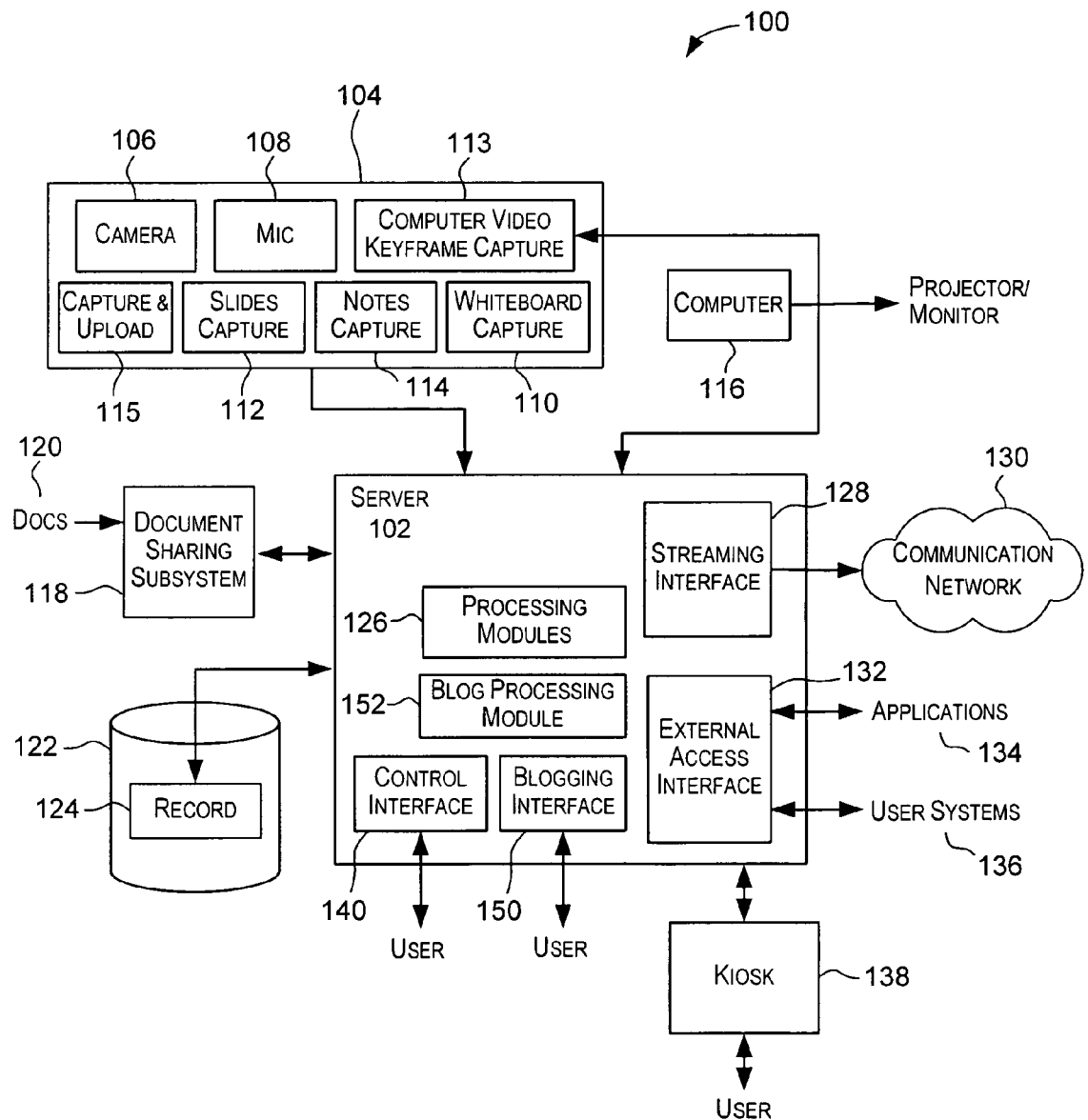
FIG. 1 depicts a simplified system that may incorporate an embodiment of the present invention.

According to an embodiment of the present invention, a system is provided for capturing or receiving digital information, processing the information, storing the information in a form that facilitates subsequent retrieval, and providing access to the stored information. Various operations may also be performed based upon the digital information. The digital information may be captured or received in relation to a meeting, presentation, classroom lecture, demonstration, conference, interview, legal proceeding, focus group meeting, surveillance activity, and the like FIG. 1 depicts a simplified system 100 that may incorporate an embodiment of the present invention. It should be understood that FIG. 1 is merely illustrative of a configuration in which the present invention may be embodied and does not limit the scope of the invention as recited in the claims. One of ordinary skill in the art would recognize other variations, modifications, combinations, and alternatives.

As depicted in FIG. 1, system 100 comprises a server 102 that is configured to receive digital information from multiple sources including one or more capture devices 104. Capture devices 104 may be configured to capture various types of information including but not restricted to audio information, video information, images, slides information, whiteboard information, notes information, and other types of information. For example, capture devices 104 may include a camera 106 (e.g., a pan-zoom-tilt camera such as the Sony EVI D-100 PTZ camera) configured to capture audiovisual or image information, a microphone 108 configured to capture audio information, a whiteboard capture device 110 (e.g., Polyvision CopyCam system) configured to capture whiteboard information, a slides capture device 112 configured to capture slides information, a computer video keyframe capture device 113 configured to capture keyframes from a video stream supplied by a computer's (e.g., a laptop, a desktop) video card to its monitor or projector when a significant change in the content of the video is detected, a notes capture device 114 configured to capture notes taken by users, a capture and upload device 15 such as a digital camera, camera phone, cellular phone, etc. configured so that data it captures/stores is manually or automatically uploaded upon connection to server 102, and other types of information capture devices. Each capture device may be configured to capture information of one or more types. Capture devices 104 may be configured to provide the captured information to server 102 for further processing.

Server 102 may also be configured to capture information from other sources. For example, server 102 may capture video and/or audio information output by a data processing system 116 which may be a laptop, desktop, etc. For example, server 102 may be configured to capture video and/or audio information output by computer 116. In one embodiment, server 102 may be configured to receive the VGA output of computer 116, which may be obtained by tapping into (e.g., with a VGA splitter) the connection between the VGA output of computer 116 and the projector/monitor. Server 102 may also receive the VGA output from the projector's/monitor's VGA output, if available. It should be understood that VGA is used here merely as an example, other graphics output formats such as DVI, etc. may also be captured.

For example, computer 116 may execute an application (e.g., a PowerPoint application) running a slides presentation (e.g., a PowerPoint presentation), and the video information captured from computer 16 may include information related to the slides. This video information received by server 102 may be processed to detect slide-related events such as when a new slide is shown, sequence of slides shown, etc. Server 102 may also receive slides information from slides capture device 112 that may also be configured to capture the information from computer 116. Server 102 may also receive screen shots of the computer's desktop. Examples of techniques for capturing information are also described in U.S. application Ser. No. 09/728,560, filed Nov. 30, 2000, U.S. application Ser. No. 09/728,453, filed Nov. 30, 2000, and U.S. application Ser. No. 09/521,252, filed Mar. 8, 2000, the entire contents of which are incorporated herein by reference for all purposes. In some embodiments, server 102 may also be configured to receive slides information from the application (e.g., a PowerPoint application) executing the slides presentation on computer 116.

Server 102 may also receive information from other sources such as from a projector, a mobile phone, a television, a DVD player, a video recorder, a monitor, and other like sources. One or more capture devices may also capture information from such sources and then communicate the information to server 102.

A document sharing system 118 may also be provided for capturing electronic documents. Document sharing system 118 may provide an interface that enables users to submit electronic documents 120 to server 102. Document sharing system 118 may also provide an interface for users to access documents that have been previously submitted to server 102. In this manner, previously submitted documents are made available and may be shared by multiple users or applications. Document sharing system 118 may be implemented in hardware, or software (code, instructions), or combinations thereof.

As described above, server 102 may receive different types of digital information including time-varying media information such as video and audio information, images, slides information, documents, etc. Server 102 is configured to store the received digital information in a memory location such as in database 122. The information may be stored in a form that facilitates subsequent retrieval, use, and analysis of the information. For time-varying media information, server 102 may synchronize and then store the captured digital information. In one embodiment, the information received by server 102 may be packaged as a record 124 and stored in database 122. A record 124 may correspond to a file, a directory including one or more subdirectories and files, a data structure, and the like. A record may also correspond to a blog entry ("blog" is short for web log which is generally a collection of frequently published information, such as a personal journal, often in chronological order, that lists events, information about events such as photos or video clips, and the author's comments about the events, etc.). A blog entry may include pointers to multimedia data such as jpegs, audio clips, and video clips, as well as metadata about the multimedia data such as the time when it was captured, a URL to the original form of that data, and a free-form textual description for that data that might describe where it was captured. Multiple records may be stored by database 122. For example, all information received by server 102 for a meeting may be stored in a record 124 for the meeting. System 100 may also be used to capture/receive information for a conference, a presentation, a lecture, an interview, a trial, a deposition, a ceremony, gathering, celebration, assembly, or any occasion when information may be captured or recorded.

In one embodiment, the digital information received by server 102 may be stored in database 122 without any processing. In other embodiments, the information received by server 102 may be processed and indexed before being stored. The processing may include changing the format of the information (e.g., from bitmap format to JPEG format), translating the information to other formats and other languages, select-ing one or more keyframes from the video information such that only the selected key frames are stored, classifying images based upon contents of the images or upon other attributes of the images, analyzing the information to determine contextual information, and so forth. One or more information processing modules 126 may be provided for performing the processing. Processing modules 126 may be implemented in software, hardware, or combinations thereof.

The digital information stored in database 122 or the information received by server 102 may be accessed in different ways by various entities. Server 102 may provide a streaming interface 128 for streaming the digital information received by server 102. The streamed information may include information captured by capture devices 104, information received from other sources such as computer 116, and other information. Various types of information may be streamed in real time including audio information, video information, slides information, whiteboard information, etc. In one embodiment, the information may be streamed in real time. The information may be broadcasted real-time via a communication network 130 using wired or wireless communication links. Communication network 130 may be a local area network (LAN), a wide area network (WAN), a wireless network, an intranet, the Internet, a private network, a public network, a switched network, or any other suitable communication network. In other embodiments, the information may be streamed directly to user systems or devices.

The digital information or portions thereof received by server 102 may also be output via external access interface 132. External access interface 132 provides an interface through which external entities may request information from server 102 and through which server 102 may provide information to the external entities. The external entities may include other applications 134 such as various multimedia applications, communication applications such as email programs, word processing applications, and the like. External entities may also include user systems 136. For example, external access interface 132 may be used to provide information to and service requests received from one or more user systems 136 used by one or more users. A user may connect to server 102 using a computer and request a portion of the digital information stored in database 122. In response, server 102 may determine the requested portion of the digital information and communicate the requested information to the requesting user system.

A control interface 140 may be provided for controlling the functionality of system 100. Control interface 140 may be used to control the information that is captured and stored by server 102. Users may also use control interface 140 to control the functionality of one or more capture devices 104. Control interface 140 may also be used to associate access permissions with the digital information stored in database 122. Control interface 140 may also be used to control when recording of information is to be started/stopped, indicate if streaming is to be enabled, etc. A user may also provide information via control interface 140. This user-provided information may be stored as part of record 124. For example, if system 100 is used to capture information during a meeting, conference, lecture, etc., information related to the meeting such as the location of the meeting, the meeting attendees, etc. may be provided by a user via control interface 140. This information may be used to annotate or index the digital information stored for the particular meeting.

Figure 2:
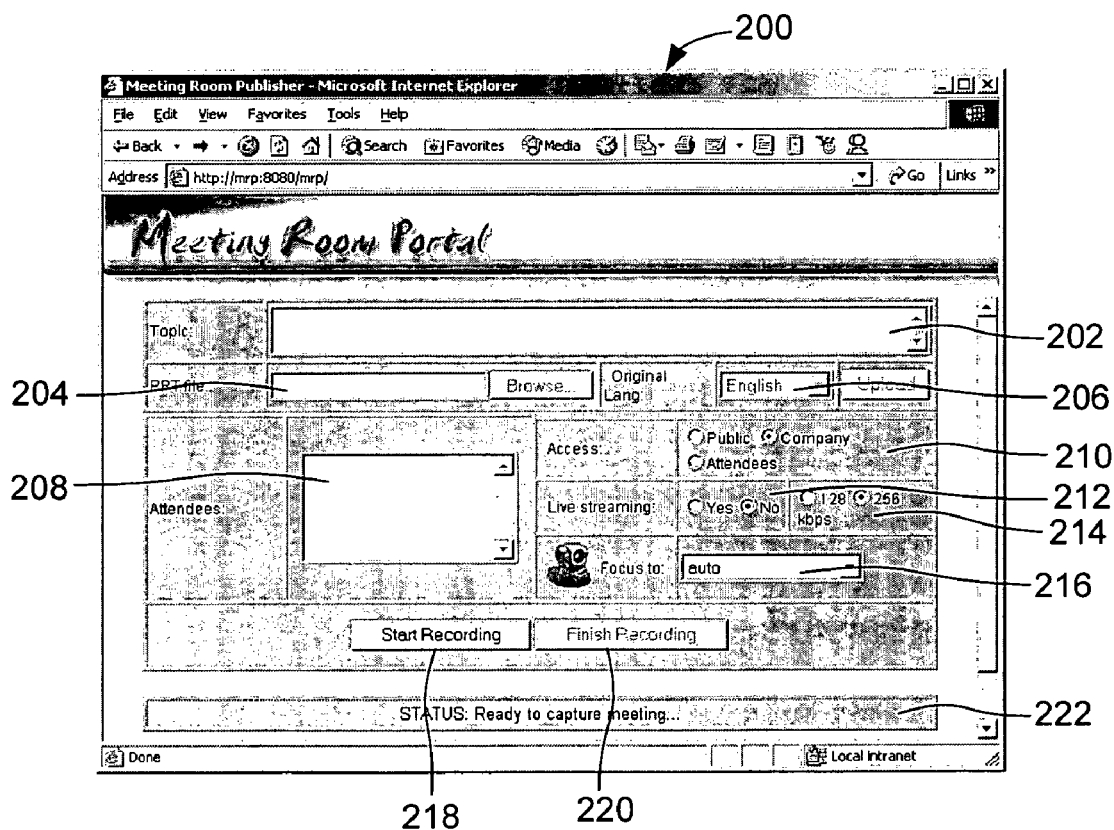
FIG. 2 depicts an example of a web-based control interface according to an embodiment of the present invention.

In one embodiment, control interface 140 may be a web-based interface that is accessible from any computer coupled to server 102 either directly or via some communication network such as the Internet or intranet. FIG. 2 depicts an example of a web-based control interface 200 according to an embodiment of the present invention. The embodiment depicted in FIG. 2 may be used when system 100 depicted in FIG. 1 is used to capture information for a meeting. System 100 may serve as a meeting room portal.

As depicted in FIG. 2, an entry field 202 is provided for entering information related to a topic to be discussed at the meeting. Entry field 204 is provided for entering the name of a presentation file (e.g., a PowerPoint *.ppt file) to be presented at the meeting. The language of the presentation may be specified using drop-down list 206. Information identifying one or more meeting attendees may be entered in field 208. Access rights for the information recorded and stored for the meeting (e.g., access permissions for record 124 stored for the meeting) may be specified using buttons 210. As depicted in FIG. 2, company-wide access is enabled. Live streaming may be enabled or disabled using selection buttons 212. The transfer rate for the live streaming may also be set using buttons 214. An operation mode of a capture device such as a camera may be configured using drop-down list 216 (set to "auto" mode in FIG. 2). As described below, in "auto" mode, the operation of the capture device may be automatically controlled based upon events detected from the captured/stored digital information. A "Start Recording" button 218 is provided for initiating information capture for the meeting and a "Finish Recording" button 220 is provided for stopping the recording. Status 222 of the recording may also be displayed. Various other types of control interfaces may be provided in alternative embodiments.

Referring back to FIG. 1, a blogging interface 150 may be provided for controlling the creation and access of blog entries. The blogs may be stored in database 122 or in other locations accessible to server 102. The blogs may be stored as part of a record 124. Users may manually create blog entries by connecting a capture device such as a digital camera to server 102 and uploading images or multimedia clips (audio or video) to server 102. A blog processing module 152 may be provided that is manually or automatically invoked in response to connection of the digital camera. Blog processing module 152 may be configured to automatically classify the image data into one of many types (e.g., document image, whiteboard image, business card image, slide image, regular image, etc.). The classification information may be included in the blog entry that may be stored as part of record 124 and used to organize the blog entries for retrieval. The automatic classification may use an image classification technique such as that described in U.S. patent application Ser. No. 11/031,516, filed Jan. 07, 2005 titled SEMANTIC CLASSIFICATION AND ENHANCEMENT PROCESSING OF IMAGES FOR PRINTING APPLICATIONS, the entire contents of which are herein incorporated by reference for all purposes.

Figure 11:
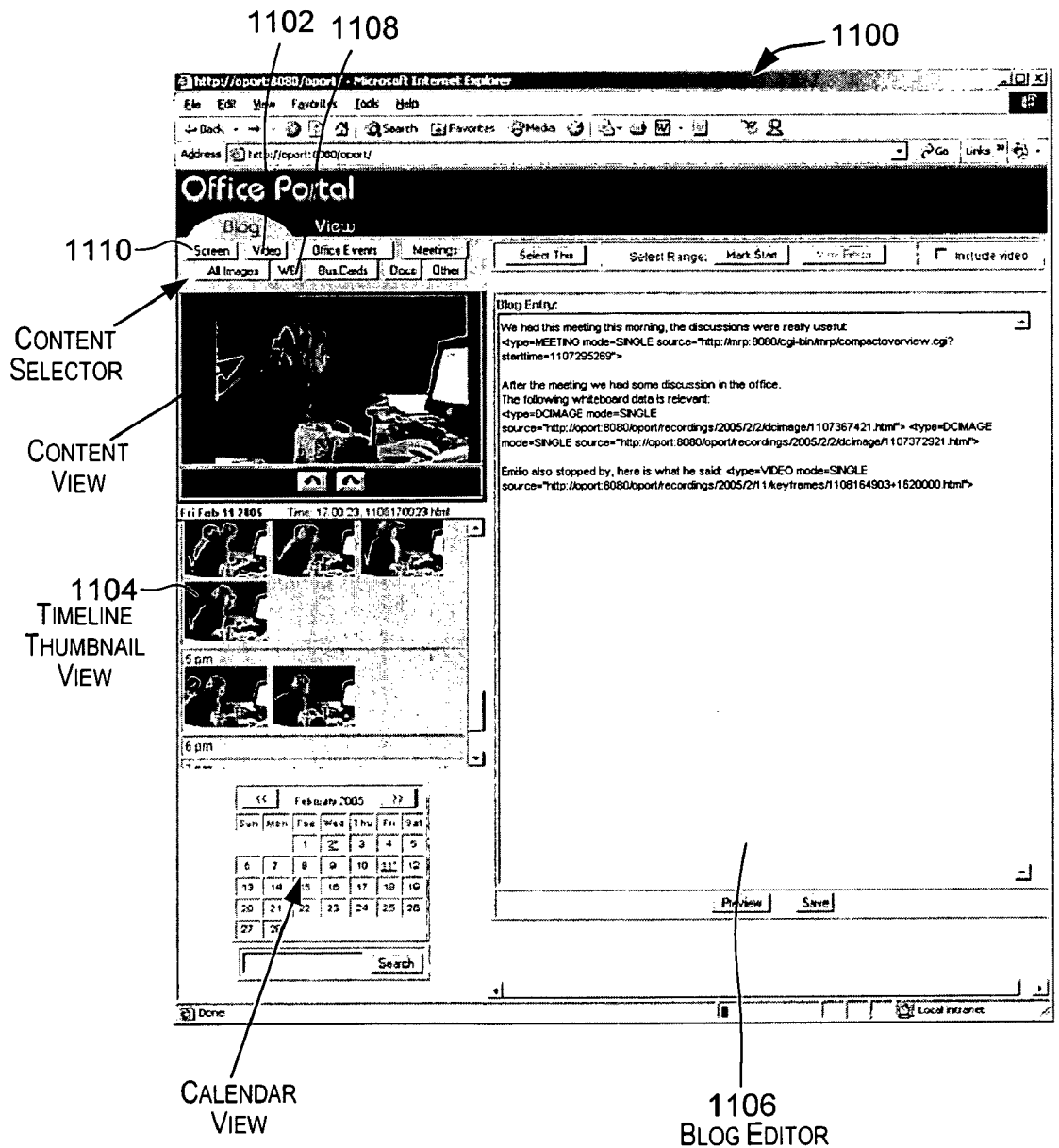
FIG. 11 depicts a simplified blogging interface according to an embodiment of the present invention.

Blog entries may also be created from information provided by capture devices 104 under control of blogging interface 150. FIG. 11 depicts a simplified blogging interface 1100 according to an embodiment of the present invention. Using interface 1100 depicted in FIG. 11, a user can create a blog entry by grabbing some content which may be selected by choosing an appropriate content selection button. For example, the user can create a blog entry by grabbing a video clip of a fixed duration (e.g., the previous 15 seconds and the next two minutes) from a capture device such as camera 106 by selecting "Video" button 1102. The video clip data is saved in database 122 and a blog entry created for it may be stored as part of record 124. The blog entry may include the time and date when it was captured and its duration (e.g., 2 minutes and 15 seconds in the above example). Key frames from that clip are displayed in time line thumbnail view 1104 and a textual representation for the blog entry record is displayed in blog editor 1106. Users can freely modify the displayed text to add whatever metadata they feel is appropriate. This may include pointers to other multimedia clips or URLs. In this example, a URL points to the multimedia recording of a meeting and the user included a pointer to a whiteboard image that was captured while that meeting was being discussed and a pointer to a video clip of that discussion—which were included in the blog entry by pressing "WB" 1108 and "Video" 1102 buttons, respectively. A user can also create a blog entry including other types of information. For example, a blog entry may be created that includes a key frame from the video on the user's computer (e.g., laptop or desktop PC) by pressing "Screen" button 1110. Users can then add descriptive text as metadata by editing the Blog entry.

Blog entries may also be automatically created from information provided by capture devices 104 under control of the blog processing module 152 using events detector 300 in FIG. 3, as described later.

Figure 12:
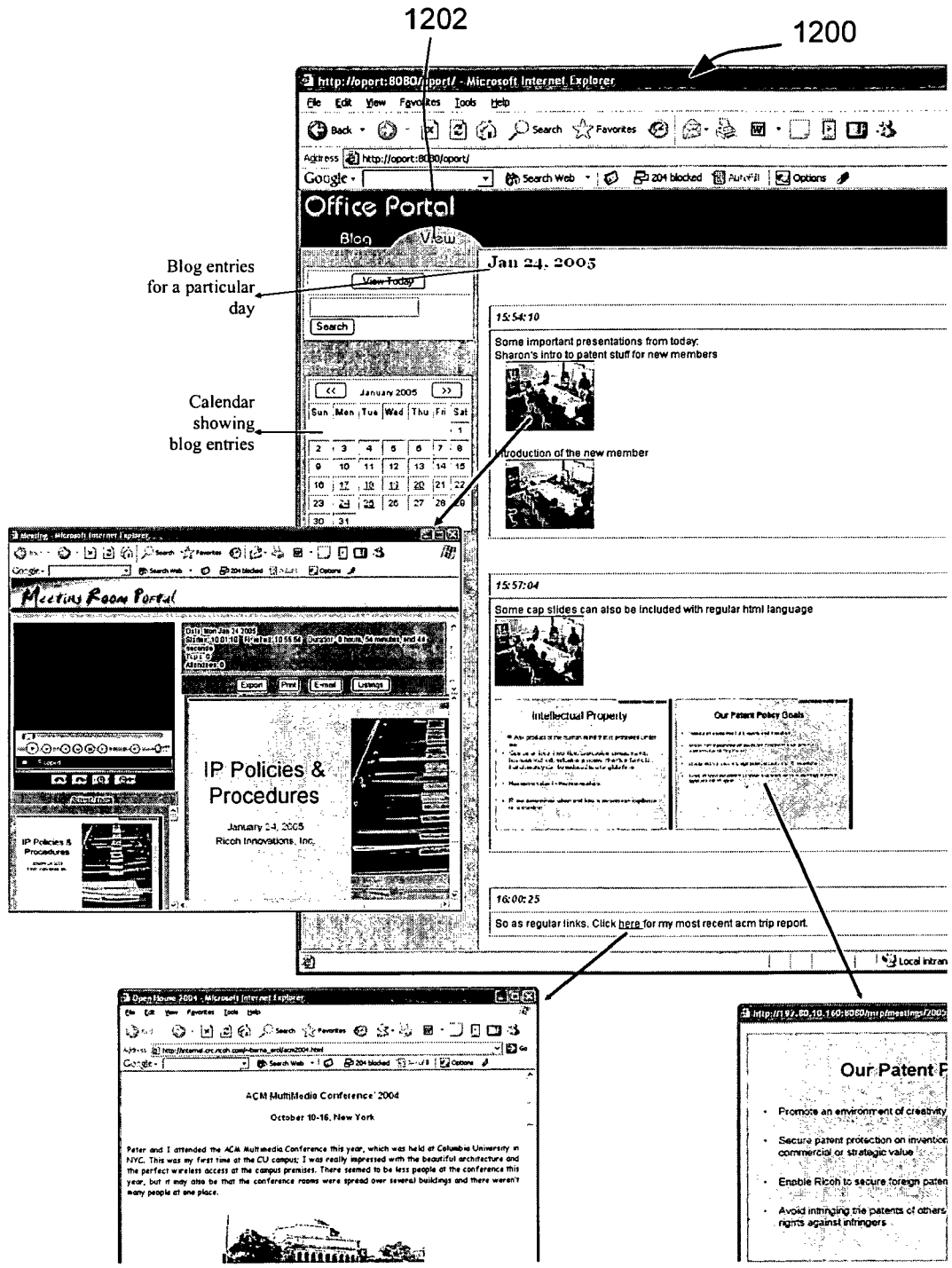
FIG. 12 depicts a simplified interface for browsing blog entries according to an embodiment of the present invention.

Blog entries may be browsed using blogging interface 150. FIG. 12 depicts a simplified interface 1200 for browsing blog entries according to an embodiment of the present invention. When a user clicks on "View" tab 1202, a Calendar is displayed showing when blog entries were created. The user can use the Calendar view to browse blog entries by date. Selection of a particular date causes the display of a time-sorted set of blog entries for that day. The user can click on any of those entries to replay the data or information (e.g., multimedia data) associated with that entry. For example, FIG. 12 shows blog entries for Jan. 24, 2005. By clicking on the first jpeg image, the user is presented a web browser that would let the user replay the recording of the meeting that occurred at 15:54:10 on that day.

Referring back to FIG. 1, users may also interact with server 102 via a kiosk 138. Users may perform various functions via kiosk 138 including controlling working of server 102, exporting information stored in database 122 or a portion thereof to an external medium, retrieving status of the recording, specifying processing to be performed on the recorded information, and other functions. Further details related to kiosk 138 are provided below.

System 100 depicted in FIG. 1 may be used to capture digital information in various different settings. For example, in one embodiment, system 100 may be used to capture information during a meeting, lecture, conference, etc. For example, capture devices 104 may be used to capture information during a meeting. In a meeting setting, camera 106 may capture video information of a meeting presenter, the audience, slides being shown on a screen, etc., microphone 108 may capture audio information spoken by a meeting presenter or other speakers/attendees of the meeting, a whiteboard capture device 110 may capture information written on a whiteboard, etc. Slides capture device 112 may be pointed to a screen and capture information related to slides presented on the screen. Slides capture device 112 may also capture slides information from a computer executing a slides presentation, for example, by receiving the video output of the computer. Notes capture device 114 may be used to capture notes taken by attendees during the meeting. Server 102 may capture video and/or audio feed from a computer 116 running a PowerPoint presentation executed during the meeting, or may receive slides information from the presentation application. Electronic copies of documents that are distributed at the meeting or discussed at the meeting may be provided via document sharing system 118. Information related to the meeting such as number of attendees, names of attendees, topic of discussion, whether or not streaming is to be enabled, access rights for the captured information, etc. may be received via a control interface such as interface 200 depicted in FIG. 2. The control interface may also be used to start/stop recording during the meeting. In this manner, system 100 may serve as a centralized system for capturing and receiving digital information related to the meeting. The information received by server 102 may be processed and stored as a meeting record 124 in database 122. Several such meeting records may be stored for various meetings.

The meeting information that is captured may be streamed in real time across a communication network. In this manner, users in remote locations connected to communication network 130 can receive the meeting information in real time without having to be present in the meeting room. The captured information may also be processed and provided to one or more applications 132 or users 136. This may be done while the meeting is progressing or subsequent to the meeting. Users may also use a kiosk 138 to download portions of the captured information to removable media such as USB drives, CDs, etc.

In this manner, system 100 when used in a meeting environment combines easy capture, useful meeting services and access methods in a single system, providing an end to end solution for capturing, accessing, sharing, streaming, and performing other functions.

Performing Actions

According to an embodiment of the present invention, the digital information captured or received by server 102 or the information stored in database 122 may be used to initiate or perform various types of actions. For example, the captured or stored information may be used to control operation of one or more capture devices, determine information that is to be output, and the like. FIG. 3 is a simplified block diagram of various modules/engines which may be used to perform actions based upon the captured/stored information according to an embodiment of the present invention. The modules depicted in FIG. 3 may be implemented in software or hardware or combinations thereof. In one embodiment, the modules depicted in FIG. 3 may be part of server 102 or may be executed by server 102.

Figure 3:
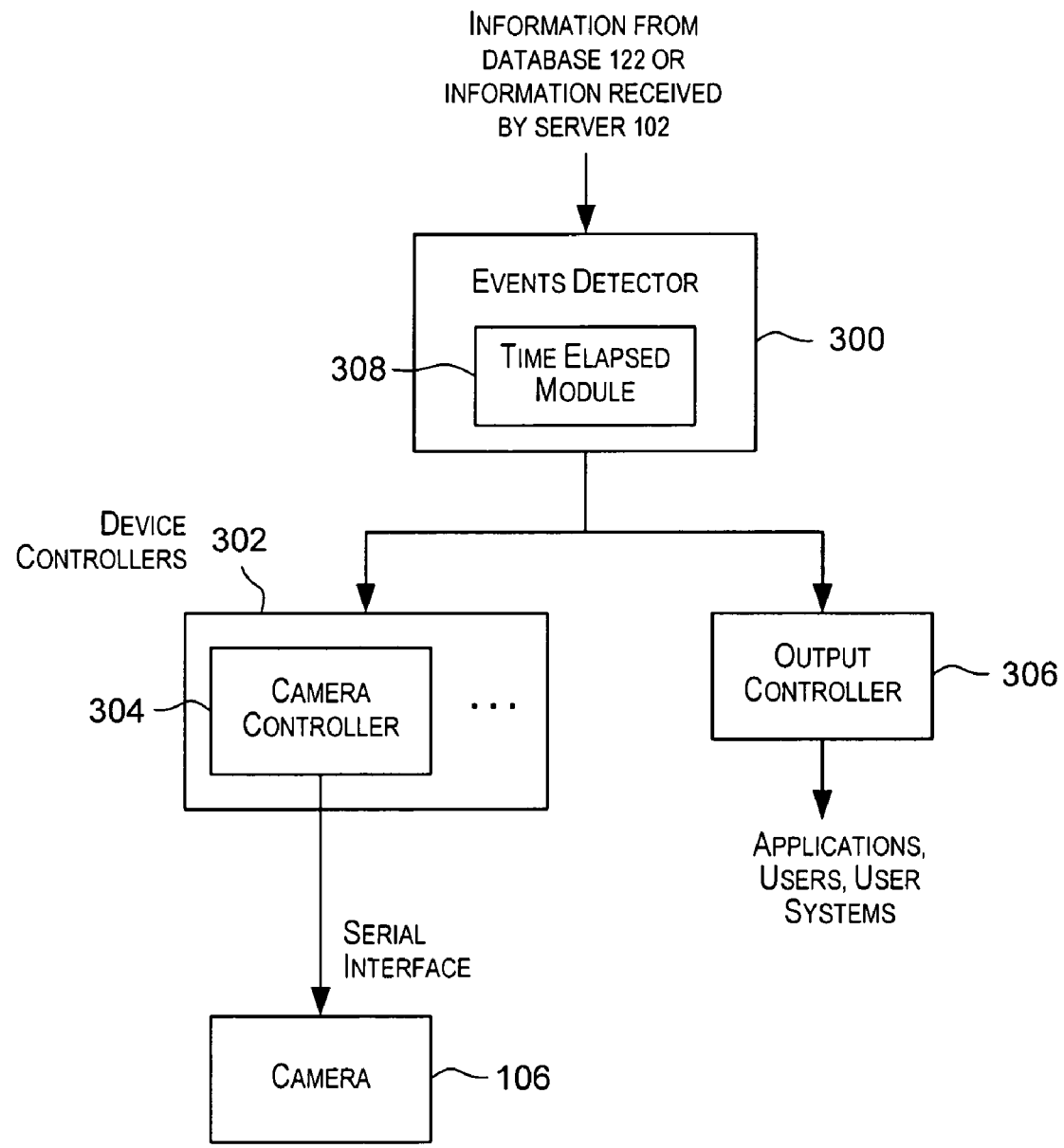
FIG. 3 is a simplified block diagram of various modules/engines which may be used to perform actions based upon the captured/stored information according to an embodiment of the present invention.

As shown in FIG. 3, an events detector 300 is configured to process the digital information received by server 102 or digital information stored in database 122 and detect one or more events that occur in the digital information. The events may be detected in real time while more information is being recorded or captured or subsequent to the recording. For example, during a meeting, the events may be detected while the meeting is progressing and information is being captured and recorded for the meeting. Events detector 300 may detect various different events from the digital information. Since the digital information may comprise information of various different types (e.g., audio, video, image, documents, slides information), the event detection techniques that events detector 300 uses to detect the events may depend on the type of the information being processed. For example, various different techniques may be used to detect events from audio information. The events that are detected from audio information may include, but are not restricted to, detecting when audio is received from a new source (e.g., when a new speaker speaks), detecting a change in the sound source, detecting a particular audio source (e.g., when a particular speaker speaks), detecting a period of silence of a particular threshold duration (which may be user-configurable), detecting a change in the direction of the sound source, and the like. For example, according to one technique, events detector 300 may perform sound localization on 4-channel audio in real-time. Examples of events that may be detected from audio information are described in D. S. Lee, B. Erol, J. Graham, J. J. Hull, and N. Murata, "Portable Meeting Recorder," ACM Multimedia, pp. 493-502, 2002, the entire contents of which are herein incorporated by reference for all purposes. Events detector 300 may also detect an event in the audio information each time the sound direction is changed. Events detector 300 may also analyze the audio stream in order to identify "audio hotspots" such as occurrences of applause, laughter, singing, shouting, etc in the audio stream. A technique for performing such analysis is described in Qian Hu et al, "Audio Hot Spotting and Retrieval Using Multiple Features" HLT-NAACL 2004 Workshop on Interdisciplinary Approaches to Speech Indexing and Retrieval, 2004, the entire contents of which are herein incorporated by reference for all purposes.

In addition to audio information, events detector 300 may also process and detect events from other types of information. For example, a video stream may be analyzed for "visual hotspots" such as occurrences in the video stream of somebody leaving the room or getting up to the whiteboard to write something, someone making gestures, etc. Examples of techniques for performing such analyses are described in D. S. Lee, B. Erol, J. Graham, J. J. Hull, and N. Murata, "Portable meeting recorder," ACM Multimedia, pp. 493-502, 2002, and B. Erol, D. Lee, J. Hull, "Multimodal summarization of meeting recordings," ICME, 2003, the entire contents of which are herein incorporated by reference for all purposes. Events may also be detected from the video information based upon the contents of the video information. For example, an event may be detected from the video information upon determining that a slide is being shown, a particular location or person is shown, a particular occurrence in the video stream, etc.

As another example, events detector 108 may detect events related to slides from the captured information. Slide-related events may be detected from various types of information received by server 102. A slide-related event is any event that is related to one or more slides. For example, server 102 may receive a video stream from a computer executing a slides presentation such as a PowerPoint presentation. Events detector may analyze the video stream to determine occurrences of slide-related events. Server 102 may also receive slides information directly from the slides presentation application. Server 102 may also receive video information from a camera that is pointed to a screen on which the slides are shown. The video stream from such a camera may be analyzed to determined slide-related events. Slide-related events may also be determined from analyzing other types of information. Slide-related events may comprise but are not restricted to determining a slide change event (e.g., when a new slide is shown), consecutive slide changes in a short time, elapsing of a user-configurable time period without a change in slide, no slide-related event for a period of time, etc. A time-elapsed module 308 may be used to detect events arising from a period of time elapsing without any events. In one embodiment, slide-related events may be detected by extracting keyframes from the captured video information.

Further examples of different events and techniques used for detecting the events from digital information are described in D. S. Lee, B. Erol, J. Graham, J. J. Hull, and N. Murata, "Portable meeting recorder," ACM Multimedia, pp. 493-502, 2002, T. Nishimura, H. Yabe, and R. Oka, "Indexing of human motion at meeting room by analyzing time-varying images of omni-directional camera," Conference on Computer Vision, vol. 1, pp. 1-4, 2000, B. Erol, D. Lee, J. Hull, "Multimodal summarization of meeting recordings," ICME, 2003, and R. Cutler, Y. Rui, A. Gupta, J. J. Cadiz, and I. Tashev, "Distributed meetings: A meeting capture and broadcasting system," ACM Multimedia, 2002, the entire contents of which are herein incorporated by reference for all purposes.

Events detector 300 may communicate the detected events to one or more device controllers 302 and an output controller 306. Device controllers 302 may be configured to control the operation of one or more capture devices based upon the events detected in the digital information. One such device controller, namely camera controller 304 is depicted in the embodiment shown in FIG. 3 and described below. It should be understood that in alternative embodiments, various other types of device controllers may be provided for controlling operations various other types of capture devices.

Camera controller 304 may be configured to control the operations of camera 106. Camera 106 may be of various types. For example, in one embodiment, camera 106 may be a pan-zoom-tilt camera for capturing video information such as the Sony EVI D-100 PTZ camera (details available at http://www.sony.net/Products/ISP/pdf/catalof/EVI_D100PE.pdf). In a meeting room setting, camera 106 may be mounted on a wall at the back of the meeting room, or otherwise appropriately placed in other locations. The pan-zoom-tilt functions of the camera may be controlled through a serial interface such as the RS-232C serial port interface. The camera may have varying pan-tilt-and zoom capabilities (e.g., pan range of the Sony camera is ±100 degrees, the tilt range is ±25 degrees, and the zoom ratio is 10×). The camera may have a wide angle (65 degrees for the Sony camera) lens built into it that allows capture of the entire meeting room without having to place the camera at a distant location. The camera may have a varying motion rate (the Sony camera has a motion rate of 300 degrees/second for pan motion and 125 degrees/second for tilt motion). The Sony camera captures analog video in NTSC resolution at 30 fps. The captured analog information may be digitized in real time using a device such as the USB2.0 Video digitizer from AverMedia (details available at http://www.aver.com/products/dv-m_AVerDVD_ezMaker_usb.shtml).

According to an embodiment of the present invention, camera controller 304 may be configured to automatically control the view captured by camera 106 based upon slide-related events detected by events detector 300 and communicated to camera controller 304. Upon receiving a slide-related event, camera controller 304 may be configured to determine a view for the camera based upon the event. Camera controller 304 may then send a signal to camera to cause camera 106 to capture the determined view. In one embodiment, the view captured by camera 106 may be controlled by controlling the pan-tilt-zoom motions of the camera. Camera controller 304 may send a signal to camera 106 to control the motion (either pan, tile, or zoom motion or combinations thereof) of camera 106 such that camera 106 captures the determined view. In this manner, the motion of camera 106 and the view captured by camera 106 may be driven by events detected by events detector 300 and communicated to camera controller 304.

As previously stated, slide-related events that are detected by events detector 300 may include but are not restricted to determining a slide change event (e.g., when a new slide is shown), consecutive slide changes in a short time, elapsing of a user-configurable time period without a change in slide, no slide-related event for a period of time, etc. In one embodiment, whenever a slide change event is detected (e.g., when a new slide is shown), camera controller 304 may send a signal to camera 106 causing the camera to change the view of the camera to focus on a presenter since when a new slide is shown it is more likely that the presenter will talk about the slide. Whenever there are many consecutive slide changes in a short time, camera controller 304 may send a signal to camera 106 causing the camera to change the view of the camera to focus on a screen where the slides are presented. Whenever a slide change is not detected for a certain amount of time, then camera controller 304 may send a signal to camera 106 causing the camera to change the view of the camera to focus on the whole meeting room. Camera 106 may be controlled to capture other views corresponding to other types of slide-related events.

Events detector 300, time elapsed module 308, device controllers 302 (including camera controller 304), and output controller 306 may be implemented in software, hardware, or combinations thereof.

In one embodiment, the pseudo-code for the automatic camera control method is as follows:

```
if (event == init)
{
    consecutiveSlideChange=0;
    currentCameraLoc =meetingroom;
    startEventNotificationModules( );
}
elsif (event == SlideChange)
{
curTime=time;
    if ((curTime-lastSlideChangeTime)<3)
        consecutiveSlideChangeCount++;
    else //timeout!
        consecutiveSlideChangeCount=0;
    if (currentCameraLoc == meetingroom)
        currentCameraLoc =presenter;
    elsif ( currentCameraLoc == presenter)
    {
        if((curTime-lastCamChangeTime)>10 and
        (consecutiveSlideChangeCount>3))
            currentCameraLoc =presentationscreen;
    }
    elsif (currentCameraLoc == presentationscreen)
    { }
    else #any other location
        currentCameraLoc =meetingroom;
    lastSlideChangeTime=time;
}
elsif (event== TimeSpan)
{
    curTime=time;
    if (currentCameraLoc == presenter)
        if (((curTime-lastSlideChangeTime)>60) and
                (curTime-lastCamChangeTime>10))
        {
            currentCameraLoc =meetingroom;
            consecutiveSlideChangeCount=0;
        }
    elsif (currentCameraLoc eq presentationscreen)
        if (((curTime-lastSlideChangeTime)>6) and
                (curTime-lastCamChangeTime>10))
        {
            currentCameraLoc =presenter;
            consecutiveSlideChangeCount=0;
        }
    elsif (currentCameraLoc == meetingroom)
    { }
    else #any other location
        currentCameraLoc =meetingroom;
}
```

In the manner described above, operations of a capture device may be controlled based upon events detected in the digital information captured/stored by server 102. The events may also be used to control the operations of other types of capture devices. In addition to automatically controlling capture devices based upon detected events, the behavior of one or more capture devices may also be controlled using control interface 140 depicted in FIG. 1 An "auto" mode may be set whereby the capture device operations are controlled based upon detected events.

As shown in FIG. 3, events detected by events detector 300 may also be communicated to output controller 306. Output controller 306 is configured to control information that is output from server 102 based upon the detected events. Based upon the event that is detected, output controller 306 may be configured to determine a portion of the digital information stored in database 122 that is to be output and the entity (user, user system, other application, etc.) to which the information is to be output. Output controller 306 may then output the identified information to the identified entity.

For example, a user remotely located from the meeting room may have configured output controller 306 such that whenever a new slide is shown, a signal is to be sent to the user's system. In this scenario, whenever a new slide event is detected, a signal may automatically be generated by output controller 306 and sent to the user's system. As another example, the user may have configured output controller 306 such that whenever a new slide is shown, the slide be translated to Japanese and then sent to the user. In this example, whenever a new slide is shown, output controller 306 may determine which slide is being shown, translate the slide to Japanese, and then communicate the translated slide to the user. In this manner, in response to a detected event, output controller 306 may determine what information is to be sent to the user, the processing (e.g., translation) to be performed, and the entity (e.g., user) to which the identified information is to be communicated.

Output controller 306 may also be configured to automatically create blog entries in response to detected events. For example, a user may configure output controller 306 such that when a significant audio event is detected, such as a phone ringing, microphone 108 is activated and audio information is captured for a certain period of time (e.g., for the next 5 minutes). A blog entry may automatically be generated and stored in database 122 (e.g., as part of record 124) that includes a pointer to this audio clip and metadata that identifies when it was captured. Video event detection could automatically save a video clip whenever the entry of a new person into a room is detected. When a significant change in the user's desktop PC or laptop video is detected, a blog entry could be automatically generated. These are examples when event detection could provide a record that would be useful in remembering, when, for example, one received a phone call last Monday. By clicking on the blog entry a recording of that call could be replayed. Video event detection would indicate when one received a visitor. That clip could be replayed to remind one what was discussed. Information captured from a computer (e.g., desktop PC) may be used to detect events indicating significant changes in what a user works on and may be useful in indicating how much time the user spent on a particular task.

Figure 4:
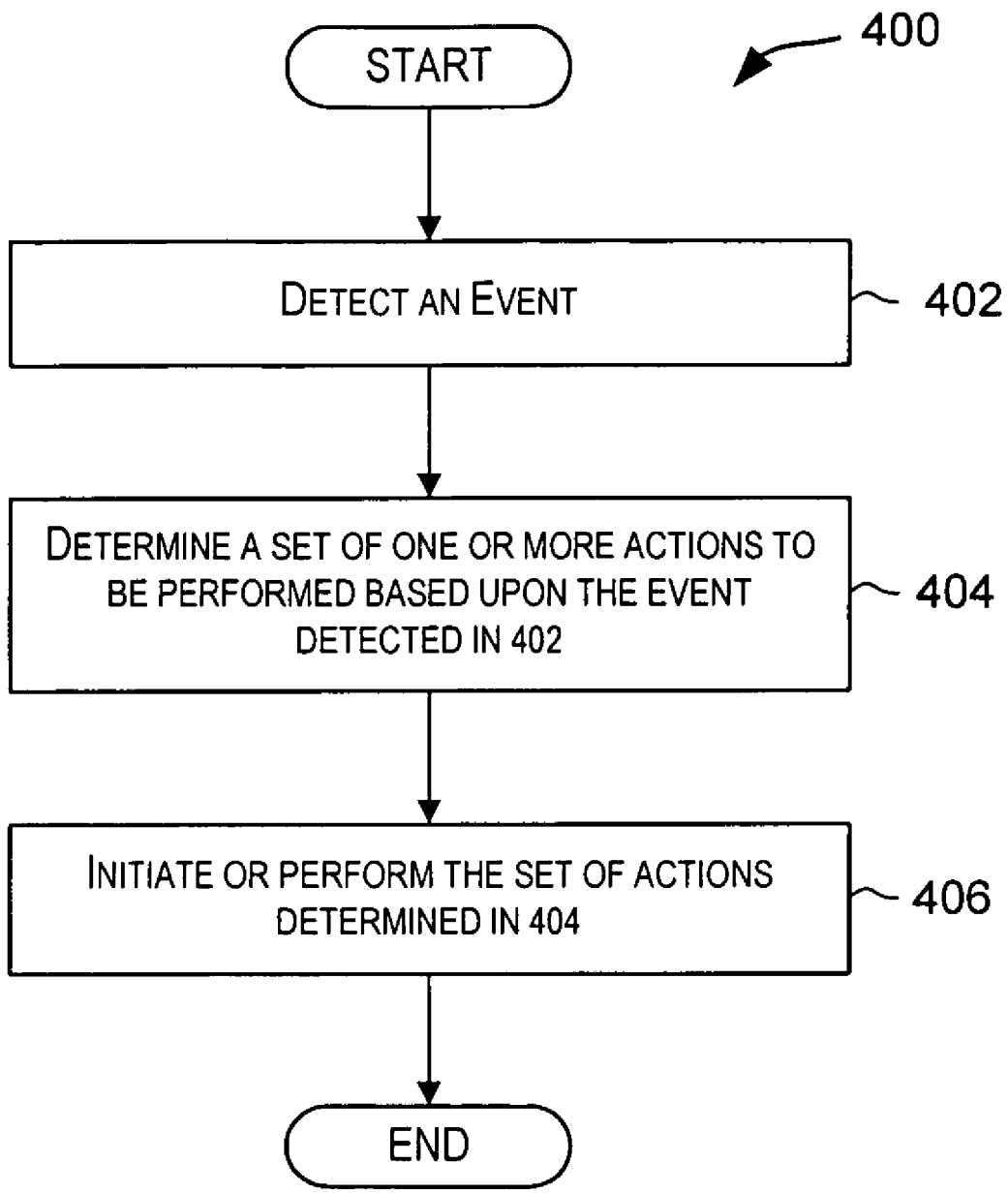
FIG. 4 depicts a simplified high-level flowchart showing a method of performing actions based upon detected events according to an embodiment of the present invention.

FIG. 4 depicts a simplified high-level flowchart 400 showing a method of performing actions based upon detected events according to an embodiment of the present invention. The processing depicted in FIG. 4 may be performed by software (code modules or instructions) executed by a processor, hardware modules, or combinations thereof. Flowchart 400 depicted in FIG. 4 is merely illustrative of an embodiment of the present invention and is not intended to limit the scope of the present invention. Other variations, modifications, and alternatives are also within the scope of the present invention. The method depicted in FIG. 4 may be adapted to work with different implementation constraints. The processing depicted in FIG. 4 may be performed by server 102.

As depicted in FIG. 4, processing may be initiated upon detection of an event (step 402). The event may be detected from the digital information received by server 102 from the various sources and/or from information stored in database 122. As described above, various different techniques may be used to detect the event. A set of one or more actions to be performed is then determined based upon the event detected in 402 (step 404). In one embodiment, information may be pre-configured identifying events and corresponding actions to be performed when occurrences of the events are detected. This pre-configured information may be used by to determine an action to be performed when an event happens. The one or more actions in the set of actions determined in 404 are then initiated or performed (step 406).

For example, a change in slide event may be detected in step 402. In response, a set of actions corresponding to the event may be determined in 404. The actions may include controlling the operation of a capture device such as changing the view of the camera to focus on the screen used for presenting slides, translating the slide into Japanese and communicating the translated slide to a user, automatically generating a blog entry, and other actions. The actions may then be initiated or performed in 406.

Sharing Documents

Documents in electronic form or paper form are frequently distributed and used in meetings, conferences etc. As depicted in FIG. 1, system 100 provides a document sharing system 118 that enables such documents to be submitted such that they can be accessed and shared by multiple users and/or applications. Some conventional systems provide means for sharing documents during meetings, but these systems do not take into consideration preferences of the user submitting the documents or needs of individuals who share or access the documents.

Figure 5:
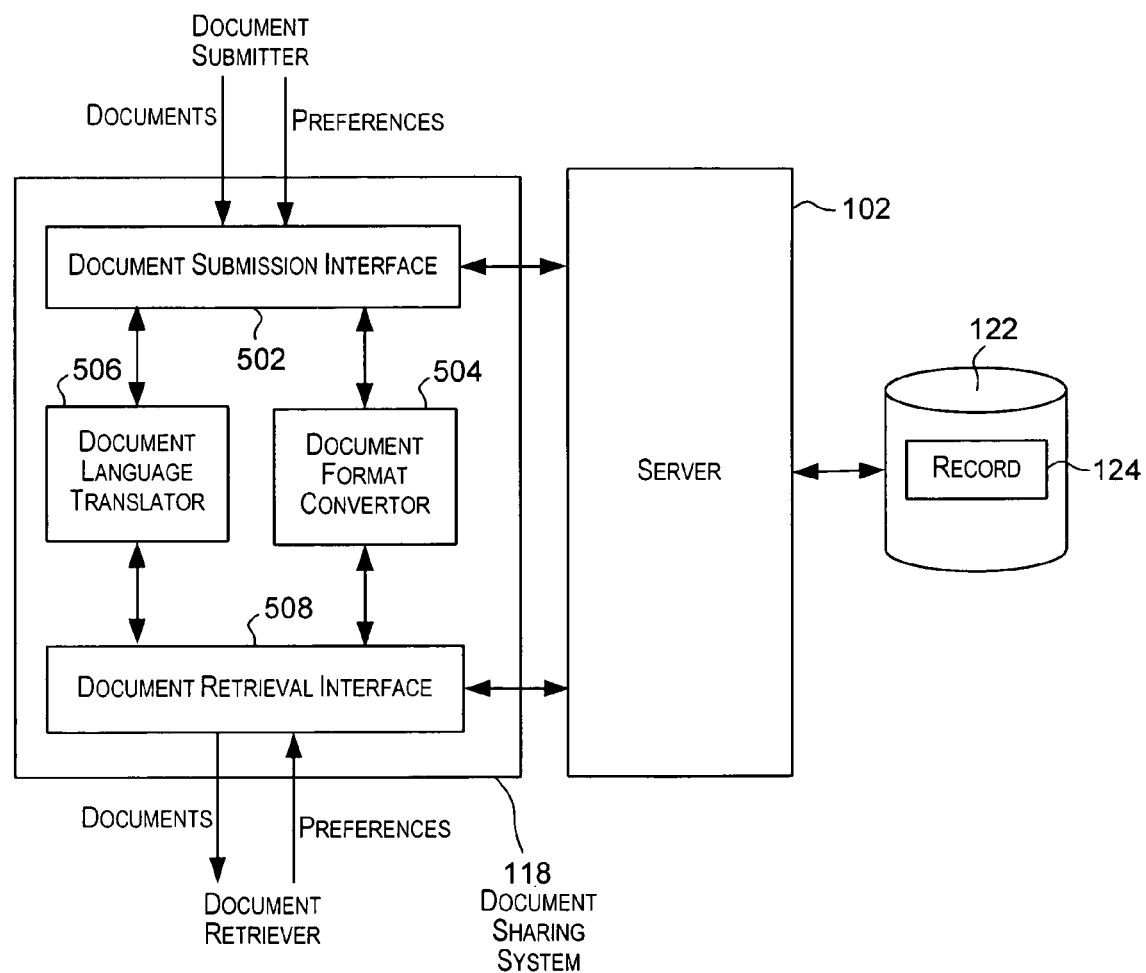
FIG. 5 is a simplified block diagram of various modules/engines of a document sharing system according to an embodiment of the present invention.

Document sharing system 118 provides a system for submitting and sharing electronic documents that takes into account the document submitter's preferences or intentions and the also the needs of users who access or retrieve the documents. FIG. 5 is a simplified block diagram of various modules/engines of document sharing system 118 according to an embodiment of the present invention. The modules depicted in FIG. 5 may be implemented in software or hardware or combinations thereof. In one embodiment, the modules depicted in FIG. 5 may be part of server 102 or may be executed by server 102.

As depicted in FIG. 5, a document submission interface 502 is provided that enables document submitters to submit electronic documents. Various different types of electronic documents may be submitted including but not restricted to text documents, documents created using a word processor (e.g., MS Word documents), spreadsheets, tables, graphs, tag-based documents (e.g., HTML documents), presentations (e.g. PowerPoint documents), multimedia documents such as audio and video clips, and other documents.

Along with submitting one or more electronic documents, the document submitter may also specify one or more preferences to be associated with the submitted documents using document submission interface 502. As part of the preferences information, the submitter may specify the meeting, conference, etc. for which the documents are submitted. Information related to the meeting such as a meeting identifier, a time of the meeting, etc. may also be provided by the document submitter.

As part of the preferences, the document submitter may also specify access rights to be associated with the submitted documents. The access right preferences are used to control the manner in which the submitted documents are to be shared between users and/or applications. In one embodiment, the document submitter may specify the access preferences for a submitted document as either shared or private and either editable or non-editable. A document tagged as "shared" is available for access by all users. Users may download the document and view the document without any restrictions. A document tagged as "editable" can be edited by users without any restrictions. A document tagged as "non-editable" cannot be edited by users who access the document. To make a document non-editable, document format converter 504 may convert the submitted document to a non-editable form before storing the document. For example, the document may be converted to non-editable PDF format. A document tagged as "private" cannot be accessed by all users. Such "private" documents can only be accessed by users specifically identified for the document by the document submitter. For example, if a document is marked "private" and submitted for a particular meeting, the document submitter may specify that only attendees of the meeting are to be allowed to access the document. A "private" document may be saved in a private space in database 122.

As part of the preferences, a document submitter may also indicate a preference for a file format or language in which a submitted document is to be shared. For example, a document submitter may submit a document in MS Word 2000 format and configure a preference indicating that the document is to be shared or accessed in MS Word 96 format. Likewise, a document submitter may submit a HTML document but indicate that the document is to be shared in text format, or submit a video clip in WindowsMedia 9.0 format and indicate a preference that the video clip be shared in QuickTime format. Based upon the preferences submitted by the document submitter, document format converter 504 is configured to change the format of the submitted document into a format in which the document is to be shared. Document language translator 506 is configured to translate a submitted document into a language that may be specified by the document submitter as part of the submitter's preferences. Various software packages may be used to do the format and language conversions. Examples of such packages include, but are not restricted to, software and services provided by SYSTRAN Software Inc. of San Diego, Calif.

(www.systransoft.com) such as SysTran Professional Language Translation software, Acrobat Distiller or Adobe Acrobat Professional provided by Adobe Corporation (www.adobe.com), Windows media encoder (http://www.microsoft.com/windows/windowsmedia/9series/encoder/default.aspx), and others.

As described above, preferences provided by the document submitter are used to determine access rights for the submitted document. A document submitter can thus control who (users or applications) can access documents submitted by the doc submitter. The submitter can also specify the format and/or language preferences for sharing the submitted documents. The format and language preferences provided by the submitter may influence the manner in which the submitted documents are stored. For example, the documents may be stored in the format and language in which the documents are to be shared, as specified by the document submitter. In this manner, the preferences provided by the document submitter affect the manner in which the submitted documents are stored.

Figure 6:
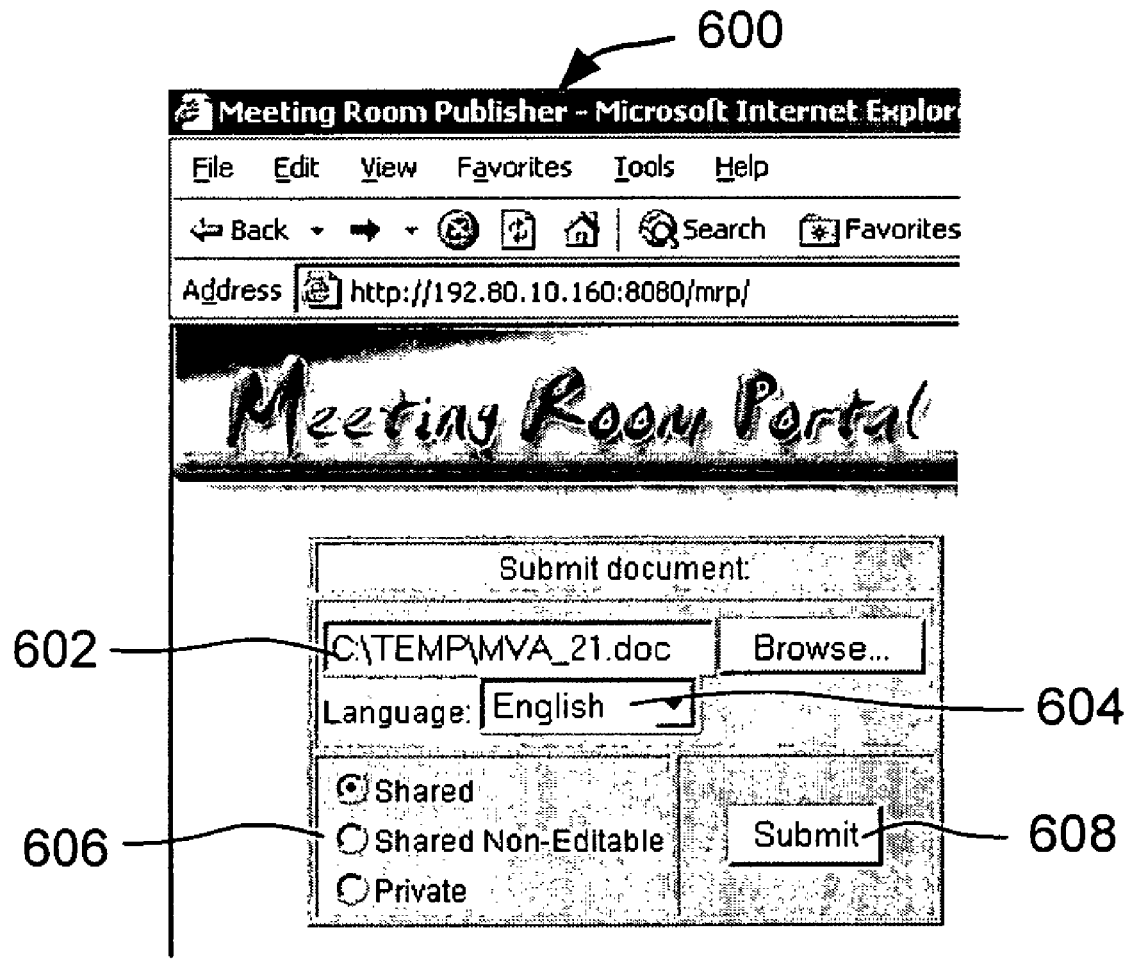
FIG. 6 depicts a simplified web-based document submission interface according to an embodiment of the present invention.

FIG. 6 depicts a simplified web-based document submission interface 600 according to an embodiment of the present invention. A document submitter may submit an electronic document by specifying the name (and possibly stored location) of the electronic document in field 602. The language of the document being submitted may be specified in field 604. Access preferences for the document may be specified in area 606. In the embodiment depicted in FIG. 6, the document is tagged as "shared", whereby the submitted document may be accessed or retrieved and edited by all users. Selection of "Submit" button 608 submits the specified document and makes it available for retrieval by other users and/or applications.

For example, a user may use interface 600 depicted in FIG. 6 to submit a document for a meeting. The document may be submitted either before the meeting, during the meeting, or even after the meeting. The submitter may provide information identifying the meeting (e.g., name, location, time, etc.) for which the document is being submitted or these may be automatically determined. Techniques for automatically determining the information is described in D. S. Lee, B. Erol, J. Graham, J. J. Hull, and N. Murata, "Portable Meeting Recorder," ACM Multimedia, pp. 493-502, 2002, the entire contents of which are herein incorporated by reference for all purposes. A submitted document is then available for retrieval by other users.

Once a document has been submitted via document submission interface 502, the document may be uploaded to server 102 and may be stored in database 122. Various different techniques such as http, ftp, etc. may be used for the upload. The document may be uploaded as submitted by the document submitter. Alternatively, the document may be converted to different formats or languages by document format converter 504 and/or document language translator 506 based upon the submitter's preferences. The document may be stored in database 122 in one or more formats and/or languages.

The uploaded documents may be stored as part of a record 124. For example, documents submitted for a particular meeting may be stored in a record created for the particular meeting. The meeting record may also store other information for the meeting such as information captured by one or more capture devices for the meeting. In this manner, all information for a meeting may be stored in a single record. This enables users to easily access information associated with the meeting.

Previously submitted documents may be accessed or retrieved by users using document retrieval interface 508. A document retriever may also provide preferences for the document access. For example, a document retriever may specify a particular language or format in which the retriever would like to retrieve the document. The requested document may be provided to the retriever based upon the retriever's preferences. For example, a user may provide preferences specifying that a document is to be retrieved in Japanese. In response, document sharing system 118 may retrieve the requested document from database 122 (using server 102), translate the document to Japanese, if needed, and then provide the document to the user (this is assuming the access preferences associated with the document by the document submitter allow the user to access the document). Document language translator 506 may be configured to perform translations from one language to another. The translated document (e.g., the Japanese document) may be stored back in database 122, so that the next time the same user wishes to retrieve the document, the Japanese document is available without requiring a translation again. Based upon the preferences of the user accessing the document, document format converter 506 may also be used to perform format conversions, if needed, before the document is provided to the document retriever.

Figure 7:
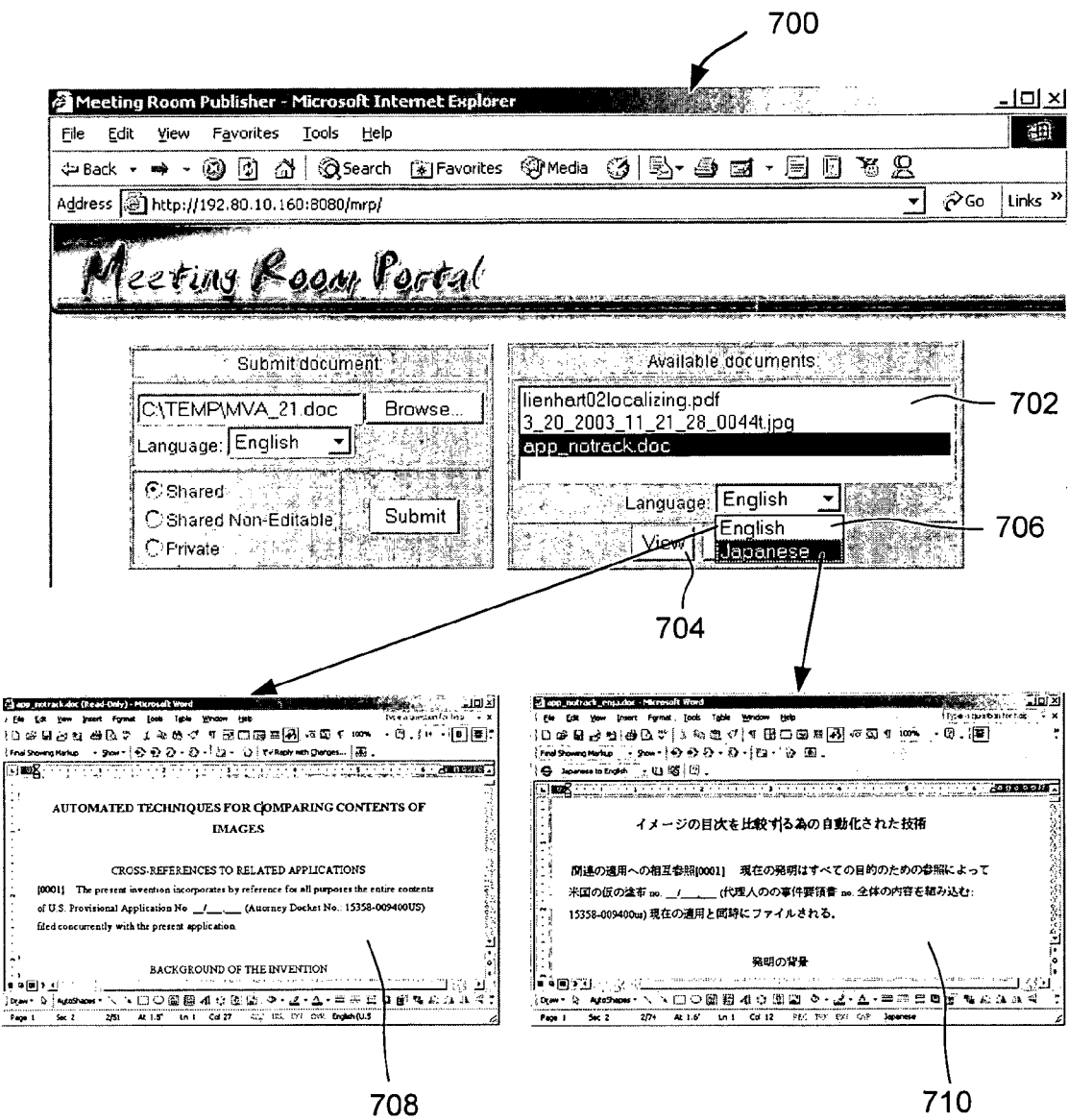
FIG. 7 depicts a simplified document retrieval interface according to an embodiment of the present invention.

FIG. 7 depicts a simplified document retrieval interface 700 according to an embodiment of the present invention. A list of previously submitted documents that are available for sharing or retrieval may be displayed in field 702. A user wishing to access a particular document can select the document from the list displayed in field 702. One or more documents may be selected for retrieval. The user may select a preferred language in which the selected document(s) are to be retrieved from drop-down list 704. The user may then view the documents according to the user's preferences by selecting "View" button 704. For example, if the user selected "English" as the preferred language, then document 708 is displayed in English. If the user selected "Japanese" as the preferred language, then the same document may be translated to Japanese, if needed, and then displayed in Japanese 710.

The translation or format conversions that may be needed based upon the document retriever's preferences may be performed upon receiving the request from the document retriever. The translations or format conversions may also have been performed prior to receiving the user's access request. For example, the translation may be performed when the document is first submitted. The translation may be performed to all the languages that are supported by the system, or a subset of those that are most commonly used. Then, based upon the language selected by the user, the appropriate language document may be provided to the user. Likewise, when a document is submitted, the document may be converted to all the formats that are supported by the system, or a subset of those that are most commonly used. Then, based upon the language selected by the user wishing to retrieve or access the document, the appropriate format document may be provided to the user.

In the manner described above, document sharing system 118 provides a document submission and retrieval tool that enables document submitters to submit documents and also specify preferences to be associated with the documents. The preferences may relate to who can retrieve the document, whether the document can be edited, the format or language in which the document can be shared with other users, and other preferences. Document sharing system 118 also enables users who want to access submitted documents to provide preferences associated with the access. The document is provided to the user based upon the user's preferences.

Kiosk

As depicted in FIG. 1, users may interact with server 102 via kiosk 138. Kiosk 138 may be any device, apparatus, computing system, monitor, etc. that can communicate with server 102. Kiosk 138 provides an interface to server 102. A user may perform various operations using kiosk 138.

Figure 8:
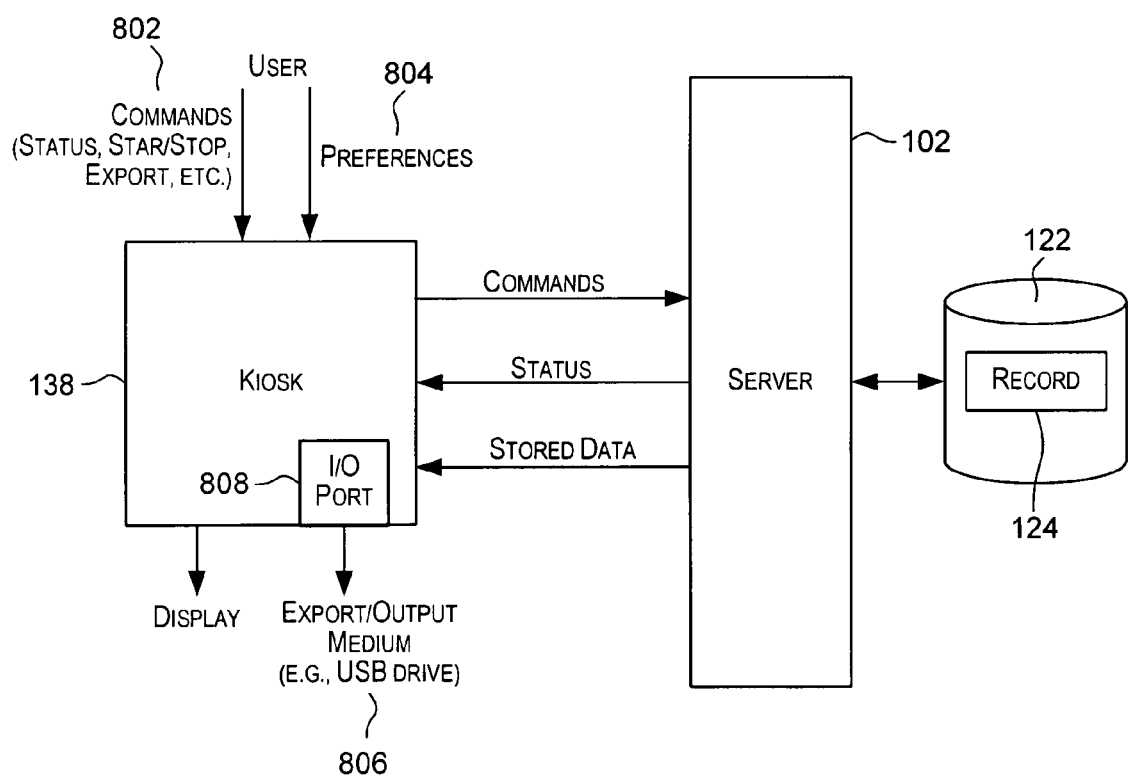
FIG. 8 depicts a simplified block diagram of a kiosk according to an embodiment of the present invention.

FIG. 8 depicts a simplified block diagram of a kiosk 138 according to an embodiment of the present invention. Kiosk 138 may provide a graphical user interface (or other interface) that enables a user to interact with kiosk 138. A user may provide commands 802 to kiosk 138 to perform one or more operations. In one embodiment, kiosk 138 converts the commands to socket calls and sends them to server 102. For example, a user may provide start/stop commands to start or stop information recording performed by server 102. A user may also provide a status request command to monitor the status of the recording process using kiosk 138. In response to a status request received from a user, kiosk 138 may query server 102 to get the recording status and output the status to the user. Various messages related to the status may be displayed by kiosk 138 such as "video recording started", "live streaming in progress", and the like.

A user may use kiosk 138 to export record data or a portion thereof, which may be stored in database 122, to an external storage medium. A user may provide preferences 804 specifying the manner (e.g., format, amount of data, the export medium, etc.) in which the data is to be exported. In one embodiment, upon receiving an export command from a user, kiosk 138 may display a screen to the user requesting the user to identify the data to be exported. Records from database 124 that are available for the user to export may be displayed in a list. For example, a list of meetings for which information has been recorded may be displayed. The user may then select one or more of the meetings or portions thereof for which data is to be exported. In one embodiment, upon receiving an export command, the most recently stored record information may be automatically selected for export. For example, a record for the most recent meeting may be selected for export.

After the user has selected the information to be exported (e.g., has selected a meeting), kiosk 138 may send a command to server 102 for the requested information. Server 102 may then retrieve the requested information from database 122 and communicate the information to kiosk 138. Kiosk 138 may then export the data to an external medium 806. The external medium may be of various types, including but not restricted to, a USB drive, an optical disk (e.g., CD, DVD, etc.), memory disk, memory card, disk drive, etc. An input/output port 808 may be provided on kiosk 138 for attaching the medium to which the information is to be exported and for exporting the information to the external medium. If the medium to which the data is to be exported is not already connected to kiosk 138, then kiosk 138 may display a message requesting the user to provide the medium. For example, a message may be displayed requesting the user to insert a USB drive. The requested data may then be exported to the external medium.

The data may be exported in various different forms. A user may identify the format for the export via preferences 804. The exported data may include keyframes extracted from video information, audio wave frames from audio information, JPEG screens shots from a presentation, and the like. Kiosk 138 may make the necessary format and syntax conversions before the data is exported. These conversions may include transcoding the digital information modifying the links in files so that those links point to the media on the output medium instead of media on a server. In this manner, the exported data is packaged such that the data can be played back from the export medium independent of server 102. In this manner, as part of the export function, the relationships between the media streams may be modified when the data is exported to ensure that the playback can occur independently from the export medium.

Kiosk 138 provides a convenient interface through which users can export data recorded by server 102 or a portion thereof to an external medium. The export interface is built into the system that is used for capturing and recording the information. For example, after a meeting has completed, an attendee of the meeting may use kiosk 138 to export data associated with the meeting to an external medium.

Figure 13:
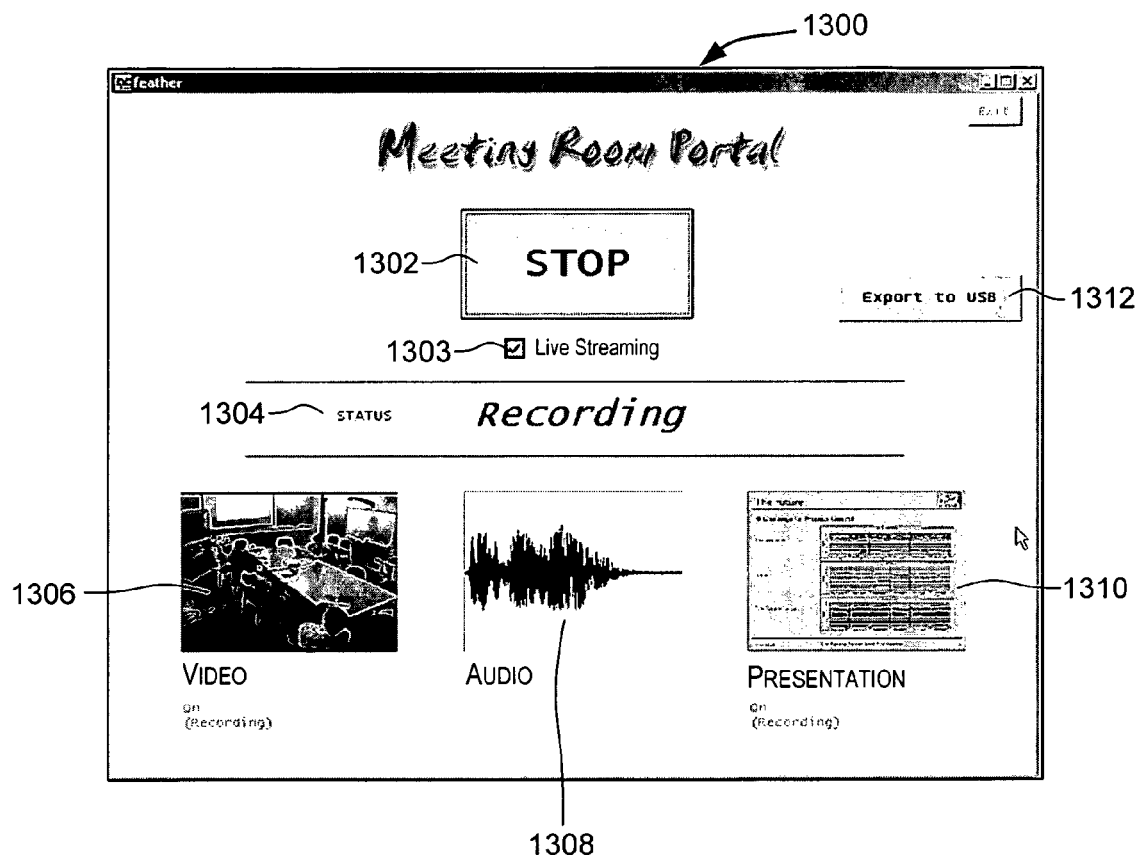
FIG. 13 depicts a simplified a graphical user interface (GUI) that may be displayed by a kiosk according to an embodiment of the present invention.

FIG. 13 depicts a simplified graphical user interface (GUI) 1300 that may be displayed by a kiosk according to an embodiment of the present invention. As depicted in FIG. 13, a "Stop" button is provided that allows a user to stop the information capturing and recording performed by server 102. Button 1302 toggles between a "Stop" operation and a "Start" operation. For example, if no recording is in progress, then button 1302 displays "Start" and enables a user to start information capturing and recording. If recording is in progress, then button 1302 displays "Stop" and enables a user to stop information capturing and recording. A checkbox 1303 is provided for enabling or disabling live streaming. A message 1304 regarding the status of the recording is displayed. A visual representation of the information being captured is also displayed. For example, as depicted in FIG. 13, visual feed 1306 video information being captured is displayed, a visual representation 1308 of the audio information being captured is displayed, and a slide 1310 from a presentation is displayed. A button 1312 is provided to enable the user to export the recorded digital information or a portion thereof to an external medium. In FIG. 13, button 1312 enables a user to export the information to a USB drive.

Multimedia Data Transfer (Copy/paste) between Applications

In many video playback and editing applications, such as Windows Media Application and Adobe Premiere, a "copy" function initiates copying of the whole content either in clipboard or to an output medium such as a CD. This copying function is however not useful for sharing video data between applications in the way text is shared between text display (IE) and text editor (MS Word) applications for example. Embodiments of the present invention provide techniques for copying and pasting multimedia data between different applications via a clipboard. The clipboard formats may be utilized by a conventional clipboard, by drag-and-drop mechanisms, or by OLE data transfer mechanisms. Embodiments of the present invention thus provide a generalized method for sharing time-varying multimedia data between applications.

As described above, the data captured and stored by system 100 depicted in FIG. 1 may include time-varying multimedia data such as audio information, video information, and the like. Further, server 102 provides an external access interface 132 for exchanging/providing the captured digital information or portions thereof with/to external applications including various multimedia applications. Embodiments of the present invention provide techniques for copying and pasting multimedia data between different applications via a clipboard.

Figure 9:
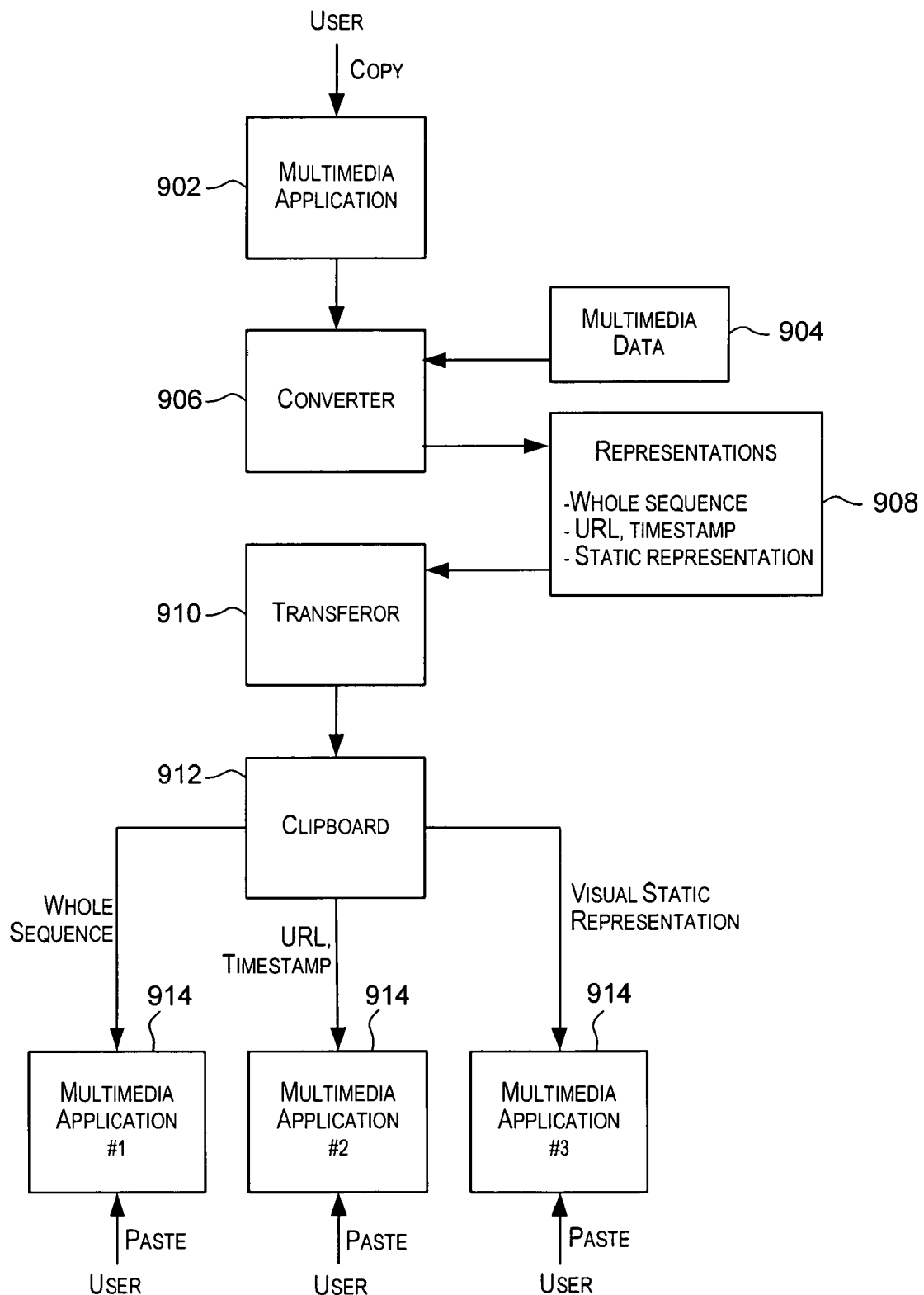
FIG. 9 depicts modules/components that may be used to provide the copy/paste functionality according to an embodiment of the present invention.

FIG. 9 depicts modules/components that may be used to provide the copy/paste functionality according to an embodiment of the present invention. As depicted in FIG. 9, a user may initiate a request to copy multimedia data 904. The request may be initiated via a multimedia application 902 such as a VideoMail application, Windows media application, and the like. The request may be communicated to a converter module 906. Converter module 906 is configured to access the multimedia data to be copied and convert it into a representation 908 for transfer to a clipboard 912. Converter module 906 may convert the multimedia data to various different representations including but not restricted to the whole multimedia sequence (e.g., the entire video clip), a uniform resource identifier URI (e.g., a URL) or location identifier for the multimedia data, a timestamp of the current moment in the multimedia data, a static visual representation of the multimedia, metadata or annotation data (such as author, duration, place, year, etc.) for the multimedia data, and other representations. For example, a URL such as mms://192.80.10.160/meetings/2005/1/27/9.59.21/video/video.wmv [0:10:15] may be created for a video clip where the first part of the URL identifies the location of the video clip at the streaming server and the second part identifies a time stamp. The multimedia data may be converted to multiple representations.

Figure 10A:
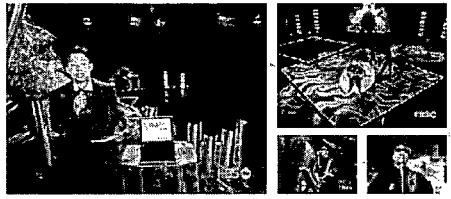
FIGS. 10A, 10B, 10C, 10D, 10E, and 10F depicts examples of static visual representations for multimedia information according to an embodiment of the present invention.
Figure 10B:
Figure 10C:
Figure 10D:
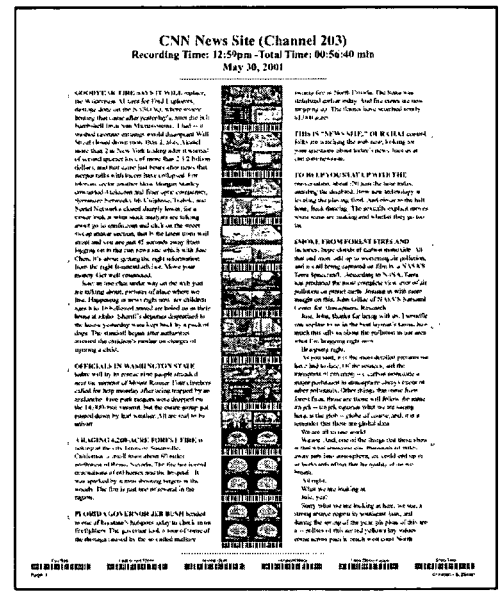
Figure 10E:
Figure 10F:
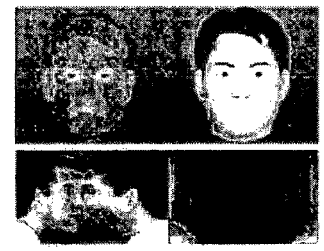

Various different static representations may be generated. Some examples are identified in the following table:

| Media Type | Static Visual Representation |
|---|---|
| Video | Keyframes of various types. One type may be the multi-keyframe Video Manga representation (example depicted in FIG. 10A) as described in S. Uchihashi, J. Foote, A. Girgensohn, J. Boreczky, 1999, "Video Manga: Generating Semantically Meaningful Video Summaries", Proc. Multimedia '99, 383-392, ACM, 1999, the entire contents of which are herein incorporated by reference for all purposes. |
| Video | Barcodes (example depicted in FIG. 10B). For example, barcodes corresponding to time points related to the video. The barcodes may be used to access the corresponding video information. |
| Video | Motion print representation (as depicted in FIG. 10C). Examples of motion print representations are described in U.S. application Ser. No. 10/954,069 titled TECHNIQUES FOR ENCODING MEDIA OBJECTS TO A STATIC VISUAL REPRESENTATION filed Sep. 28, 2004 (Attorney Docket No. 015358-009800US), the entire contents of which are herein incorporated by reference for all purposes. |
| Video, audio, whiteboard, slides | Paper-based static representation of multimedia information (as depicted in FIG. 10D). Examples of such paper-based static representations are described in U.S. application Ser. No. 10/001,895 titled PAPER-BASED INTERFACE FOR MULTIMEDIA INFORMATION filed Nov. 19, 2001 (Attorney docket No. 015358-006500US), the entire contents of which are herein incorporated by reference for all purposes. |
| Audio (music) | Music notes (as depicted in FIG. 10E). |
| Audio (speech) | Text. For example, transcription of the audio speech. |
| 3D synthesized talking head | Static 2D representations of the face model and texture (as depicted in FIG. 10F) |
| Audio wave | Bitmap representation |

The multimedia data may also be converted to various other representations.

A transferor module 910 is configured to transfer the one or more representations 908 generated by converter 906 to clipboard 912. Multiple representations may be transferred to one or multiple clipboards (e.g., multiple clipboards are supported by MS Windows). The various representations may be copied individually or in combination to the clipboards. In one embodiment, in the clipboard, they may be represented with an XML representation or a standard representation such as MPEG-7. Alternatively, in systems where multiple clipboards are supported, different representations of multimedia can be copied into several clipboards.

The representations transferred to clipboard 912 are then available to be pasted to one or more applications. For example, one or more of the representations may be transferred to one or more multimedia applications 914. A user may initiate a paste operation from a multimedia application 914. The paste operation may identify a specific representation(s) to be pasted. In response, one or more specified representations from clipboard 912 may be pasted into the multimedia application 914. Different representations may be pasted in response to different paste requests. For example, the URL representation and time stamp may be pasted in one multimedia application, a visual static representation may be transferred into another application (e.g., an image editing application), the whole multimedia data sequence may be transferred into another application, and the like. For example, the URL and time stamp may be pasted into a VideoMail editor, which is a specialized HTML editor that generates a user friendly representation of the video and the link.

In the manner described above, embodiments of the present invention enable copy/paste operations of time-based multimedia data using one or more clipboards. As part of the processing, the digital multimedia data may be converted into one or more representations that are transferred to the clipboard. The representations from the clipboard may be pasted to different applications.

Figure 14:
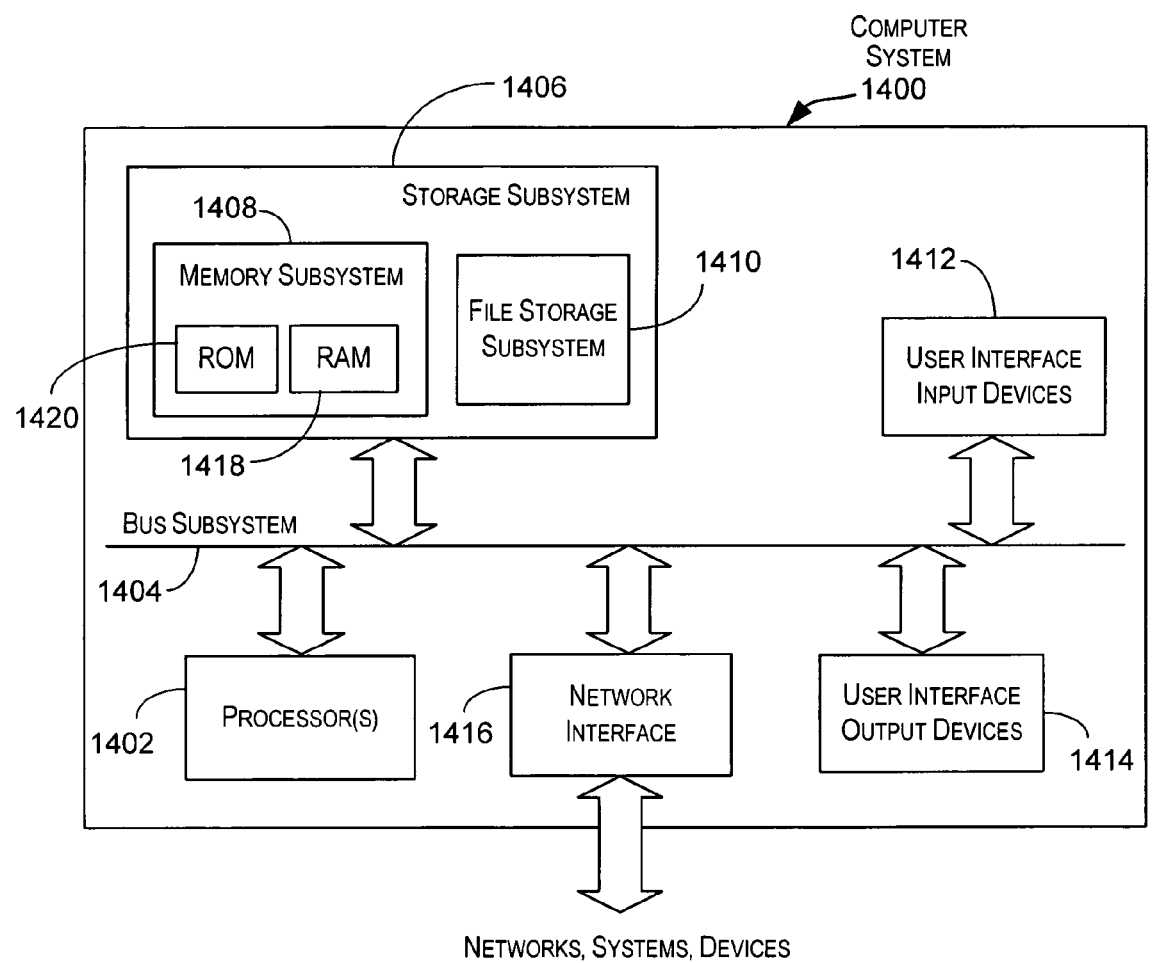
FIG. 14 is a simplified block diagram of a computer system that may be used to perform processing according to an embodiment of the present invention

FIG. 14 is a simplified block diagram of a computer system 1400 that may be used to perform processing according to an embodiment of the present invention. As shown in FIG. 14, computer system 1400 includes a processor 1402 that communicates with a number of peripheral devices via a bus subsystem 1404. These peripheral devices may include a storage subsystem 1406, comprising a memory subsystem 1408 and a file storage subsystem 1410, user interface input devices 1412, user interface output devices 1414, and a network interface subsystem 1416. The input and output devices allow a user to interact with computer system 1400.

Network interface subsystem 1416 provides an interface to other computer systems, networks, servers, and clients. Network interface subsystem 1416 serves as an interface for receiving data from other sources and for transmitting data to other sources from computer system 1400. Embodiments of network interface subsystem 1416 include an Ethernet card, a modem (telephone, satellite, cable, ISDN, etc.), (asynchronous) digital subscriber line (DSL) units, and the like.

User interface input devices 1412 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 1400.

User interface output devices 1414 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1400.

Storage subsystem 1406 may be configured to store the basic programming and data constructs that provide the functionality of the present invention. For example, according to an embodiment of the present invention, software code modules (or instructions) implementing the functionality of the present invention may be stored in storage subsystem 1406. These software modules or instructions may be executed by processor(s) 1402. Storage subsystem 1406 may also provide a repository for storing data used in accordance with the present invention. Storage subsystem 1406 may comprise memory subsystem 1408 and file/disk storage subsystem 1410.

Memory subsystem 1408 may include a number of memories including a main random access memory (RAM) 1418 for storage of instructions and data during program execution and a read only memory (ROM) 1420 in which fixed instructions are stored. File storage subsystem 1410 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 1404 provides a mechanism for letting the various components and subsystems of computer system 1400 communicate with each other as intended. Although bus subsystem 1404 is shown schematically as a single bus, alternative embodiments of the bus subsystem may utilize multiple busses.

Computer system 1400 can be of various types including a personal computer, a portable computer, a workstation, a network computer, a mainframe, a kiosk, or any other data processing system. Due to the ever-changing nature of computers and networks, the description of computer system 1400 depicted in FIG. 14 is intended only as a specific example for purposes of illustrating the preferred embodiment of the computer system. Many other configurations having more or fewer components than the system depicted in FIG. 14 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. Further, the various interfaces (e.g., GUIs) described above are merely illustrative of an embodiment of the present invention and do not limit the scope of the invention as recited in the claims. One of ordinary skill in the art would recognize other variations, modifications, and alternatives.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method performed by a computer system of processing digital information, the method comprising:

receiving digital information at the computer system, the digital information including information captured by a set of one or more capture devices, a portion of the information captured by the set of capture devices including video information captured from a first capture device of a slide presentation;

analyzing the digital information with the computer system to determine a set of one or more events, the set of events including a set of slide-related events identified by the computer system based in part from the video information captured by the first capture device;

determining, with the computer system, a sequence of actions to be performed based upon the set of events; and performing the sequence of actions using the computer system;

wherein the computer system determines a view based on the set of slide-related events and controls operation of the first capture device based on the sequence of actions to capture the view, the computer system causing the first capture device to:

focus on a presenter when at least one slide-related event in the set of slide-related events indicates a slide change, focus on a screen used for showing one or more slides when at least one slide-related event in the set of slide-related events indicates consecutive slide changes, and focus on a room where a presentation is occurring when at least one slide-related event in the set of slide-related events indicates that a time period has elapsed without a slide change.

2. The method of claim 1 wherein:

controlling operation of the first capture device comprise controlling operation of a camera in the set of capture devices.

3. The method of claim 2 wherein:

controlling operation of the camera comprises:

causing the camera to capture the view using the computer system.

4. The method of claim 1 wherein the set of slide-related events comprises at least one of an event indicating a second slide change, an event indicating another set of consecutive slide changes, or an event indicating that a second period of time has elapsed without a slide change.

5. The method of claim 1 wherein the computer system controls operation of a second capture device based on the sequence of actions to capture the view to:

focus on the presenter when the at least one slide-related event indicates a slide change;

focus on the screen used for showing one or more slides when the at least one slide-related event indicates consecutive slide changes; and focus on the room where a presentation is occurring when the at least one slide-related event indicates that a time period has elapsed without a slide change.

6. The method of claim 1 wherein performing the sequence of actions comprises:

determining, based upon an event from the set of events, a portion of the digital information using the computer system to be output; and outputting the portion of the digital information using the computer system.

7. The method of claim 6 wherein:

performing the sequence of actions further comprises determining an entity using the computer system to which the portion of the digital information is to be output; and outputting the portion of the digital information using the computer system comprises outputting the portion of the digital information using the computer system to the entity.

8. The method of claim 1 wherein performing the sequence of actions comprises:

creating a blog entry using the computer system based on an event in the set of events.

9. The method of claim 1:

wherein receiving the digital information at the computer system further comprises receiving a document submitted by a first user;

the method further comprising:

receiving at the computer system, from the first user, a first set of one or more preferences to be associated with the document;

receiving at the computer system a request from a second user to access the document;

receiving at the computer system a second set of one or more preferences from the second user; and providing the document to the second user the computer system according to the second set of preferences.

10. The method of claim 9 wherein providing the document to the second user according to the second set of preferences comprises providing the document to the second user according to the second set of preferences using the computer system only if permitted by the first set of preferences.

11. The method of claim 9 wherein:

the first set of preferences identifies a format for accessing the document; and providing the document to the second user according to the second set of preferences comprises providing the document to the second user according to the second set of preferences using the computer system in the format identified by the first set of preferences.

12. The method of claim 9 wherein:

the first set of preferences identifies a language for accessing the document; and providing the document to the second user according to the second set of preferences comprises providing the document to the second user according to the second set of preferences using the computer system in the language identified by the first set of preferences.

13. The method of claim 9 wherein:

the second set of preferences identifies a format in which the document is to be accessed, and providing the document to the second user according to the second set of preferences comprises providing the document to the second user according to the second set of preferences using the computer system in the format identified by the second set of preferences.

14. The method of claim 9 wherein:

the second set of preferences identifies a language in which the document is to be accessed; and providing the document to the second user according to the second set of preferences comprises providing the document to the second user according to the second set of preferences using the computer system in the language identified by the second set of preferences.

15. The method of claim 1 further comprising streaming a portion of the digital information using the computer system via a network.

16. The method of claim 1 further comprising:

receiving at the computer system a request to copy a portion of the digital information;

converting, responsive to the copy request, the portion of the digital information using the computer system to a set of one or more representations; and copying the set of representations using the computer system to a clipboard.

17. The method of claim 16 further comprising:

receiving at the computer system a request to paste the portion of the digital information; and pasting at least one representation from the set of representations from the clipboard using the computer system.

18. The method of claim 16 wherein the set of representations comprises a first representation and a second representation, the method further comprising:

receiving, from a first application, a first request using the computer system to paste the portion of the digital information;

receiving, from a second application, a second request using the computer system to paste the portion of the digital information;

pasting, responsive to the first request, the first representation from the clipboard into the first application; and pasting, responsive to the second request, the second representation from the clipboard into the second application.

19. The method of claim 1 further comprising:
receiving, via a kiosk communicatively coupled to the computer system, a request at the computer system to export a portion of the digital information; and
exporting the portion of the digital information using the computer system to an external medium associated with the kiosk.

20. A system for processing digital information, the system comprising:
a set of one or more capture devices; and
a computer system, the computer system configured to:
receive digital information, the digital information comprising information captured by the set of capture devices, a portion of the information captured by the set of capture devices including video information captured from a first capture device in the set of capture devices;
analyze the digital information to determine a set of one or more events, the set of events including a set of slide-related events identified based in part from the video information captured by the first capture device;
determine a sequence of actions to be performed based upon the set of events; and
perform the sequence of actions;
wherein the computer system determines a view based on the set of slide-related events and controls operation of the first capture device based on the sequence of actions to capture the view, the computer system causing the first capture device to:
focus on a presenter when at least one slide-related event in the set of slide-related events indicates a slide change,
focus on a screen used for showing one or more slides when at least one slide-related event in the set of slide-related events indicates consecutive slide changes, and
focus on a room where a presentation is occurring when at least one slide-related event in the set of slide-related events indicates that a time period has elapsed without a slide change.

21. The system of claim 20 wherein the sequence of actions comprises controlling operation of a camera in the set of capture devices.

22. The system of claim 21 wherein:
controlling operation of the camera comprises:
causing the camera to capture the view.

23. The system of claim 20 wherein the set of slide-related events comprises at least one of an event indicating a second slide change, an event indicating another set of consecutive slide changes, or an event indicating that a second period of time has elapsed without a slide change.

24. The system of claim 20 the sequence of actions comprises:
determining, based upon an event from the set of events, a portion of the digital information to be output; and
outputting the portion of the digital information.

25. The system of claim 24 wherein:
the sequence of actions comprises determining an entity to which the portion of the digital information is to be output; and
outputting the portion of the digital information comprises outputting the portion of the digital information to the entity.

26. The system of claim 20 wherein the sequence of actions comprises creating a blog entry based upon an event from the set of events.

27. The system of claim 20 wherein:
the digital information received by the computer system comprises a document submitted by a first user; and
the computer system is configured to:
receive, from the first user, a first set of one or more preferences to be associated with the document; and
receive a request to access the document from a second user,
receive a second set of one or more preferences from the second user; and
provide the document to the second user according to the second set of preferences.

28. The system of claim 27 wherein the computer system is configured to provide the document to the second user according to the second set of preferences only if permitted by the first set of preferences.

29. The system of claim 27 wherein the first set of preferences identifies a format for accessing the document, and the computer system is configured to provide the document to the second user according to the second set of preferences in the format identified by the first set of preferences.

30. The system of claim 27 wherein the first set of preferences identifies a language for accessing the document, and the computer system is configured to provide the document to the second user according to the second set of preferences in the language identified by the first set of preferences.

31. The system of claim 27 wherein the second set of preferences identifies a format in which the document is to be accessed, and the computer system is configured to provide the document to the second user according to the second set of preferences in the format identified by the second set of preferences.

32. The system of claim 27 wherein the second set of preferences identifies a language in which the document is to be accessed, and the computer system is configured to provide the document to the second user according to the second set of preferences in the language identified by the second set of preferences.

33. The system of claim 20 wherein the computer system is configured to stream a portion of the digital information via a network.

34. The system of claim 20 wherein the computer system is configured to:
receive a request to copy a portion of the digital information;
convert, responsive to the copy request, the portion of the digital information to a set of one or more representations; and
copy the set of representations to a clipboard.

35. The system of claim 34 wherein the computer system is configured to:
receive a request to paste the portion of the digital information; and
paste at least one representation from the set of representations from the clipboard.

36. The system of claim 34 wherein the set of representations comprises a first representation and a second representation and wherein the computer system is configured to:
receive, from a first application, a first request to paste the portion of the digital information;
receive, from a second application, a second request to paste the portion of the digital information;
paste, responsive to the first request, the first representation from the clipboard into the first application; and paste, responsive to the second request, the second representation from the clipboard into the second application.

37. The system of claim 20 further comprising:
a kiosk coupled with the computer system, wherein the kiosk is configured to:
receive, via the kiosk, a request to export a portion of the digital information; and
export the portion of the digital information to an external medium.

38. An apparatus for processing digital information, the apparatus comprising:
means for receiving digital information, the digital information including information captured by a set of one or more capture devices, a portion of the information captured by the set of capture devices including video information captured from a first capture device of a slide presentation;
means for analyzing the digital information to determine a set of one or more events, the set of events including a set of slide-related events identified based in part from the video information captured by the first capture device;
means for determining a sequence of actions to be performed based upon the set of events; and
means for performing the sequence of action;
wherein the means for performing the sequence of actions comprises:
means for determining a view based on the set of slide-related events, and
means for controlling operation of the first capture device based on the sequence of actions to capture the view, the means for controlling causing the first capture device to:
focus on a presenter when at least one slide-related event in the set of slide-related events indicates a slide change,
focus on a screen used for showing one or more slides when at least one slide-related event in the set of slide-related events indicates consecutive slide changes, and
focus on a room where a presentation is occurring when at least one slide-related event in the set of slide-related events indicates that a time period has elapsed without a slide change.

* * * * *